US010616417B2

(12) United States Patent
Kawahara et al.

(10) Patent No.: US 10,616,417 B2
(45) Date of Patent: Apr. 7, 2020

(54) CONTROL SYSTEM, COMMUNICATION SYSTEM, CONTROL METHOD, AND RECORDING MEDIUM

(71) Applicants: Megumi Kawahara, Kanagawa (JP); Yoshinaga Kato, Kanagawa (JP); Takashi Inaoka, Tokyo (JP)

(72) Inventors: Megumi Kawahara, Kanagawa (JP); Yoshinaga Kato, Kanagawa (JP); Takashi Inaoka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/368,112

(22) Filed: Dec. 2, 2016

(65) Prior Publication Data

US 2017/0085717 A1  Mar. 23, 2017

Related U.S. Application Data

(63) Continuation of application No. PCT/JP2015/066074, filed on Jun. 3, 2015.

(30) Foreign Application Priority Data

Jun. 10, 2014 (JP) ................. 2014-119342

(51) Int. Cl.
*H04M 3/56* (2006.01)
*H04M 3/38* (2006.01)
(Continued)

(52) U.S. Cl.
CPC .......... *H04M 3/567* (2013.01); *G06F 21/604* (2013.01); *G06F 21/606* (2013.01);
(Continued)

(58) Field of Classification Search
CPC ...................... H04M 3/566; H04M 2203/5027
See application file for complete search history.

(56) References Cited

U.S. PATENT DOCUMENTS 6,940,960 B2 *  9/2005  Benco ............... H04M 3/56
                                                         379/202.01
8,565,749 B2   10/2013  Satake
(Continued)

FOREIGN PATENT DOCUMENTS

EP  2 493 143 A1  8/2012
GB  2344968       8/2002
(Continued)

OTHER PUBLICATIONS

International Search Report dated Aug. 11, 2015 in PCT/JP2015/066074 filed on Jun. 3, 2015.
(Continued)

*Primary Examiner* — Nafiz E Hoque
(74) *Attorney, Agent, or Firm* — Oblon, McClelland, Maier & Neustadt, L.L.P.

(57) ABSTRACT

A control system is provided for controlling participation of another communication terminal in a session when the session has been established for transmitting information between communication terminals. The control system includes a participation control unit configured to reject participation of the other communication terminal in the session in the case where the session has been established based on a communication start request by one of the communication terminals specifying a first destination, and to permit the participation of the other communication terminal in the session in the case where the session has been established based on a communication start request by one of the communication terminals specifying a second destination different from the first destination.

10 Claims, 24 Drawing Sheets

(51) Int. Cl.

| | | |
|---|---|---|
| *G06F 21/60* | (2013.01) | |
| *H04L 12/18* | (2006.01) | |
| *H04L 29/06* | (2006.01) | |
| *H04N 7/15* | (2006.01) | |
| *H04L 29/12* | (2006.01) | |
| *H04M 3/51* | (2006.01) | |

(52) U.S. Cl.
CPC ...... *H04L 12/1822* (2013.01); *H04L 65/1093* (2013.01); *H04L 65/403* (2013.01); *H04M 3/38* (2013.01); *H04N 7/152* (2013.01); *H04L 61/6022* (2013.01); *H04M 3/51* (2013.01); *H04M 2203/5009* (2013.01); *H04N 7/15* (2013.01)

(56) References Cited

U.S. PATENT DOCUMENTS

| | | | |
|---|---|---|---|
| 8,861,377 | B2 | 10/2014 | Okuyama et al. |
| 8,885,008 | B2 | 11/2014 | Okita et al. |
| 9,131,104 | B2 | 9/2015 | Nakafuji et al. |
| 9,185,344 | B2 | 11/2015 | Inoue |
| 2004/0028199 | A1* | 2/2004 | Carlson ................. H04M 3/564 379/93.21 |
| 2004/0047461 | A1* | 3/2004 | Weisman .......... H04M 3/42008 379/202.01 |
| 2007/0172044 | A1* | 7/2007 | Nguyen .............. H04L 12/1818 379/202.01 |
| 2010/0027531 | A1 | 2/2010 | Kurashima |
| 2010/0226287 | A1 | 9/2010 | Horvath et al. |
| 2012/0147127 | A1 | 6/2012 | Satterlee et al. |
| 2012/0221702 | A1 | 8/2012 | Umehara et al. |
| 2014/0049597 | A1 | 2/2014 | Inoue |

FOREIGN PATENT DOCUMENTS

| | | |
|---|---|---|
| JP | 2001-518755 | 10/2001 |
| JP | 2004-228833 | 8/2004 |
| JP | 2004-241975 | 8/2004 |
| JP | 2005-064860 | 3/2005 |
| JP | 2007-300244 | 11/2007 |
| JP | 2008-199397 | 8/2008 |
| JP | 2010-035022 | 2/2010 |
| JP | 2012-075073 | 4/2012 |
| JP | 2012-191598 | 10/2012 |
| JP | 2013-085208 | 5/2013 |
| JP | 2014-038522 | 2/2014 |
| JP | 2014-200063 | 10/2014 |

OTHER PUBLICATIONS

Written Opinion dated Aug. 11, 2015 in PCT/JP2015/066074 filed on Jun. 3, 2015.
Extended European Search Report dated May 31, 2017 in Patent Application No. 15806480.8.
Notice of Rejection Issued in Japanese Patent Application 2019-020757 dated Jan. 21, 2020 with English Machine Translation (5 pages).

* cited by examiner

FIG.6A

AUTHENTICATION MANAGEMENT TABLE

| COMMUNICATION ID | PASSWORD |
|---|---|
| 01aa | aaaa |
| 01ab | abab |
| 01ba | baba |
| ... | ... |

FIG.6B  TERMINAL MANAGEMENT TABLE

| COMMUNI-CATION ID | DESTINATION NAME (TERMINAL NAME) | OPERATIONAL STATE | COMMUNICA-TION STATE | IP ADDRESS OF TERMINAL |
|---|---|---|---|---|
| 01aa | CUSTOMER: TOKYO OFFICE AA TERMINAL | ONLINE (COMMUNICATION AVAILABLE) | None | 1.2.1.3 |
| 01ab | CUSTOMER: TOKYO OFFICE AB TERMINAL | OFFLINE | | 1.2.1.4 |
| ... | ... | ... | ... | ... |
| 01ba | CALL CENTER: BA TERMINAL (reception1) | ONLINE (TALKING) | Private Calling | 1.2.2.3 |
| 01bb | CUSTOMER: OSAKA OFFICE BB TERMINAL | ONLINE (TALKING) | Private Busy | 1.2.2.4 |
| ... | ... | ... | ... | ... |
| 01cb | CUSTOMER: NEW YORK OFFICE CB TERMINAL | OFFLINE | | 1.3.1.4 |
| 01db | CALL CENTER: DB TERMINAL (reception2) | ONLINE (TALKING) | Private Busy | 1.3.2.4 |
| ... | ... | ... | ... | ... |

FIG.6C

DESTINATION LIST MANAGEMENT TABLE

| START REQUEST COMMUNICATION ID | DESTINATION COMMUNICATION ID |
|---|---|
| 01aa | 01xx, 01ab, ・・・ |
| 01ab | 01xx, 01aa |
| 01ba | 01aa, 01ab, ・・・ |
| 01cb | 01xx |
| 01db | 01aa, 01ab, ・・・ |
| ・・・ | ・・・ |

FIG.6D

SESSION MANAGEMENT TABLE

| SESSION ID | RELAY APPARATUS ID | PARTICIPATING TERMINAL COMMUNICATION ID |
|---|---|---|
| se1 | 111e | 01aa, 01db |
| se2 | 111b | 01ba, 01be |
| se3 | 111c | 01cd, 01cf |
| ・・・ | ・・・ | ・・・ ・・・ |

FIG.7A

STATE CHANGE MANAGEMENT TABLE (A)

| MANAGEMENT INFORMATION | BEFORE-CHANGE STATE INFORMATION | CHANGE INFORMATION |
|---|---|---|
| Call | None | Accepted |
| Join | Accepted | Busy |
| | Private Accepted | Private Busy |
| Leave | Busy | None |
| | Private Busy | None |

FIG.7B

STATE CHANGE MANAGEMENT TABLE (B)

| MANAGEMENT INFORMATION | TERMINAL INFORMATION | BEFORE-CHANGE STATE INFORMATION | CHANGE INFORMATION |
|---|---|---|---|
| Invite | Start Request Terminal | None | Calling |
| | Destination Terminal | None | Ringing |
| Private Invite | Start Request Terminal | None | Private Calling |
| | Destination Terminal | None | Private Ringing |
| Accept | Start Request Terminal | Calling | Accepted |
| | | Private Calling | Private Accepted |
| | | Accepted | Accepted |
| | | Private Accepted | Private Accepted |
| | Destination Terminal | Ringing | Accepted |
| | | Private Ringing | Private Accepted |

FIG.7C

GROUP INFORMATION MANAGEMENT TABLE

| COMMUNICATION ID | GROUP INFORMATION | DESTINATION NAME (GROUP NAME) | INCLUDED TERMINAL COMMUNICATION ID |
|---|---|---|---|
| 01aa | FALSE | | |
| 01ab | FALSE | | |
| 01ca | FALSE | | |
| 01cb | FALSE | | |
| 01cc | FALSE | | |
| 01da | FALSE | | |
| ... | FALSE | | |
| 01xx | TRUE | CALL CENTER | 01ba, 01db |
| ... | ... | ... | ... |

FIG.7D

GROUP STATE MANAGEMENT TABLE

| GROUP ID | OPERATIONAL STATE |
|---|---|
| 01xx | ONLINE (COMMUNICATION AVAILABLE) |
| ... | ... |

FIG.17A

VIDEO CONFERENCE START REQUEST
IS RECEIVED FROM TOKYO OFFICE
AA TERMINAL.
THIS CONFERENCE IS PARTICIPATION
LIMITED CONFERENCE.
DO YOU PARTICIPATE IN CONFERENCE?

YES     NO

FIG.17B

VIDEO CONFERENCE START REQUEST
IS RECEIVED FROM TOKYO OFFICE
AA TERMINAL.

YES     NO

CONTROL SYSTEM, COMMUNICATION SYSTEM, CONTROL METHOD, AND RECORDING MEDIUM

CROSS-REFERENCE TO RELATED APPLICATIONS

The present application is a continuation application of International Application No. PCT/JP2015/066074 filed on Jun. 3, 2015, which claims priority to Japanese Patent Application No. 2014-119342 filed on Jun. 10, 2014. The contents of these applications are incorporated herein by reference in their entirety.

BACKGROUND OF THE INVENTION

1. Field of the Invention

The present invention relates to a technology which controls participation of another communication terminal in a session used for content data transmission between communication terminals.

2. Description of the Related Art

In recent years, responding to a demand for reducing cost and time, a communication system has become popular which provides a video conference or a telephone call via a communication network such as the Internet. In this kind of a communication system, when communications between communication terminals are started, content data including image data and audio data is transmitted and received, and thus, a video conference, a telephone call, etc., can be realized.

Further, in a communication system used in the form of a call center, etc., a call request, a destination of which is a call center, is provided to a communication terminal selected from a plurality of communication terminals by a switch, and a session between two communication terminals is established (refer to PLT 1). In this kind of a communication system, in order to provide necessary security, there is a case where another communication terminal is not allowed to participate in a session between two communication terminals.

On the other hand, in a communication system used in the form of a video conference, etc., there is a method in which a call is established among multiple sites by allowing another communication terminal to participate in a session in which content data is transmitted between communication terminals (refer to PLT 2). In this type of a communication system, a communication state of each communication terminal is maintained, and, in the case where a destination communication terminal is already in a state of communication when a communication terminal requests a communication start, the communication terminal as a communication start request source is allowed to participate in a session in which the destination communication terminal is participating.

In recent years, responding to a demand for space saving, diversification of businesses, etc., it has come to be desired to establish a communication system which can be used in multiple forms. According to a communication management system described in PLT 3, the communication management system establishes a session with limited participation and a session with unlimited participation based on a selected button displayed in a making-a-call confirmation dialog box of a communication terminal.

CITATION LIST

Patent Literature

[PLT 1]
Japanese Unexamined Patent Application Publication No. 2005-064860
[PLT 2]
Japanese Unexamined Patent Application Publication No. 2012-191598
[PLT 3]
Japanese Unexamined Patent Application Publication No. 2014-038522

SUMMARY OF THE INVENTION

A control system is provided. When a session for transmitting information has been established between communication terminals, participation of another communication terminal in the session is controlled by the control system. The control system includes a participation control unit configured to reject participation of the other communication terminal in the session in the case where the session has been established based on a communication start request by one of the communication terminals specifying a first destination, and to permit the participation of the other communication terminal in the session in the case where the session has been established based on a communication start request by one of the communication terminal specifying a second destination different from the first destination.

Advantageous Effects of Invention

According to an embodiment, a control system controls participation of another communication terminal in an established session based on a destination specified when the session has been established. With the above arrangement, it is possible for a communication terminal to avoid selecting between limited participation and unlimited participation every time when the communication terminal requests a communication start, and thus, load of a user is reduced.

BRIEF DESCRIPTION OF THE DRAWINGS

FIG. 6A is a conceptual diagram of a table managed by the communication management system.

FIG. 6B is a conceptual diagram of a table managed by the communication management system.

FIG. 6C is a conceptual diagram of a table managed by the communication management system.

FIG. 6D is a conceptual diagram of a table managed by the communication management system.

FIG. 7A is a conceptual diagram of a table managed by the communication management system.

FIG. 7B is a conceptual diagram of a table managed by the communication management system.

FIG. 7C is a conceptual diagram of a table managed by the communication management system.

FIG. 7D is a conceptual diagram of a table managed by the communication management system.

FIG. 17A is a drawing illustrating a display example of a start permission accepting screen.

FIG. 17B is a drawing illustrating a display example of a start permission accepting screen.

DETAILED DESCRIPTION OF THE PREFERRED EMBODIMENTS

In the following, referring to the accompanying drawings, a communication terminal and a communication system according to an embodiment will be described.

<<Overall Configuration of a Communication System 1>>

Figure 1:
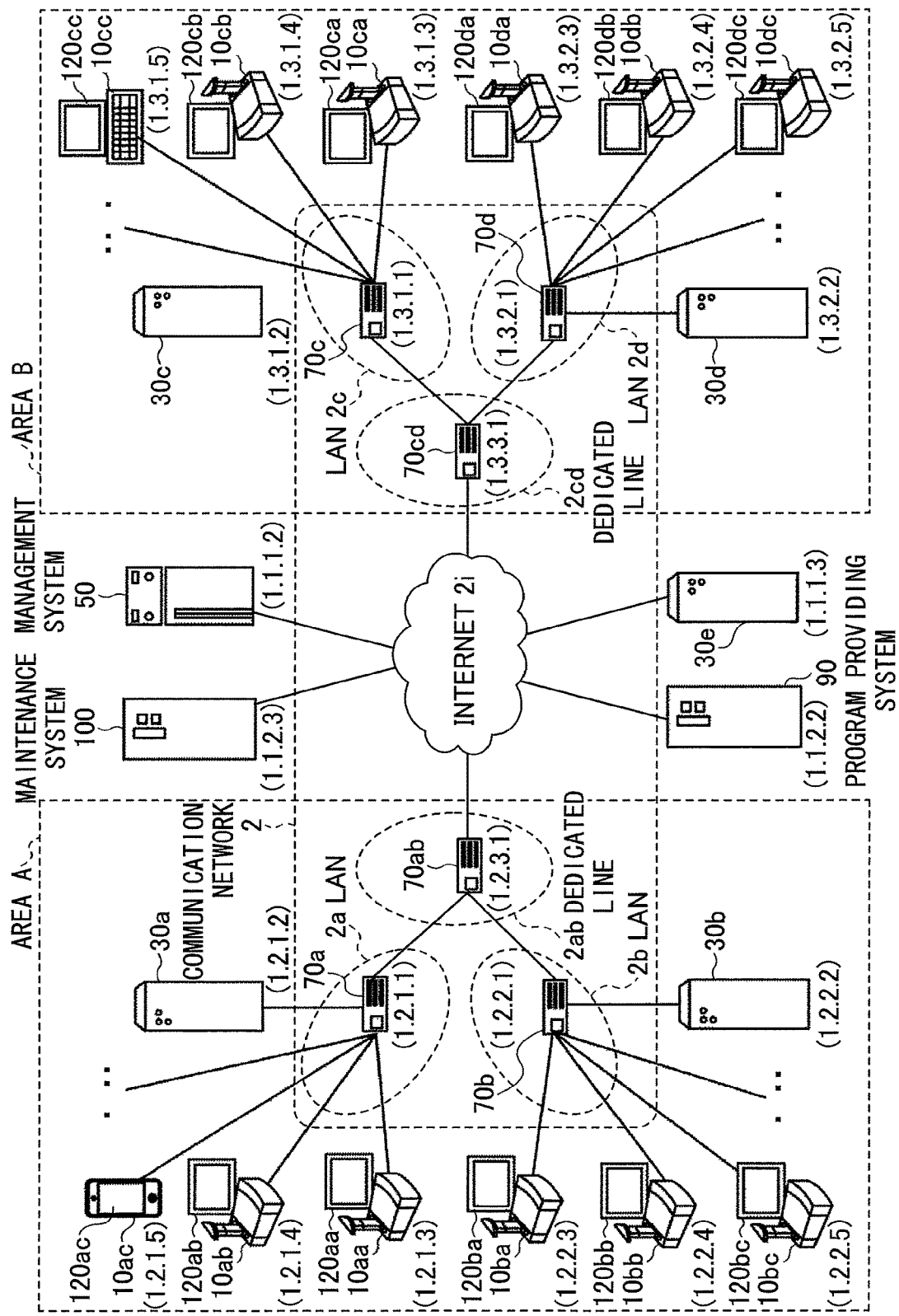
FIG. 1 is a schematic diagram of a communication system.

FIG. 1 is a schematic diagram of a communication system 1 according to an embodiment. First, referring to FIG. 1, an outline of the communication system 1 will be described. The communication system 1 includes a data providing system in which content data is transmitted from one communication terminal to another communication terminal in one direction via a communication management system, and a communication system in which information including emotional information is transmitted to each other among a plurality of communication terminals via the communication management system. The communication system is used for transmitting information including emotional information among a plurality of communication terminals (corresponding to "communication terminal") via a communication management system (corresponding to "communication management system"). As an example of the communication system, a video conference system, a video phone system, an audio conference system, an audio telephone system, a personal computer (PC) screen sharing system, or the like can be listed.

In an embodiment, it is assumed that a video conference system is an example of the communication system, a video conference management system is an example of the communication management system, and a video conference terminal is an example of the communication terminal. A communication system 1, a communication management system 50, and a communication terminal 10 will be described.

The communication system 1 illustrated in FIG. 1 includes a plurality of communication terminals (10aa, 10ab, . . . ), displays (120aa, 120ab, . . . ) for the terminals (10aa, 10ab, . . . ), a plurality of relay apparatuses (30a, 30b, 30c, 30d, 30e), a communication management system 50, a program providing system 90, and a maintenance system 100. It should be noted that, in the following, a "communication terminal" will be simply described as a "terminal", and a "communication management system" will be simply described as a "management system".

It should be noted that, in an embodiment, any one of the terminals (10aa, 10ab, . . . ) will be described as a "terminal 10", any one of the displays (120aa, 120ab, . . . ) will be described as a "display 120", and any one of the relay apparatuses (30a, 30b, 30c, 30d, 30e) will be described as a "relay apparatus 30".

A terminal 10 transmits and receives various types of information items to and from other apparatuses. The terminal 10 establishes a session, for example, between the terminal 10 and another terminal 10, and communicates with the other terminal 10 by transmitting and receiving content data including audio data and image data in the established session. With the above arrangement, a video conference between a plurality of terminals 10 is realized in the communication system 1.

In the following, "image data and audio data" will be described as "content data". It should be noted that the data transmitted between the terminals 10 is not limited to the data described in an embodiment. For example, the content data may be text data, or, the content data may include audio data, image data, and text data. Further, the image data may be a video image or a still image. Further, the image data may include both a video image and a still image.

The management system 50 manages the terminals 10 and the relay apparatuses 30 in a centralized manner. The management system 50 realizes a video conference of communications between the terminals 10 by establishing a session for transmitting content data between the terminals 10.

Further, routers (70a, 70b, 70c, 70d, 70ab, 70cd) select an optimal route of content data. It should be noted that, in the communication system 1, any one of the routers (70a, 70b, 70c, 70d, 70ab, 70cd) may be described as a "router 70". The relay apparatus 30 relays content data between terminals 10.

The program providing system 90 includes a hard disk (HD) (not shown) in which a terminal program for realizing various functions or units of the terminal 10 is stored, and is capable of transmitting the terminal program to the terminal 10. Further, the HD of the program providing system 90 also stores a relay apparatus program for realizing various functions or units of the relay apparatus 30, and the relay apparatus program can be transmitted to the relay apparatus 30. Further, the HD of the program providing system 90 also stores a communication management program for realizing various functions or units of the management system 50, and the communication management program can be transmitted to the management system 50.

The maintenance system 100 is a computer for maintaining or managing at least one of the terminal 10, the relay apparatus 30, the management system 50, and the program providing system 90. For example, in the case where the maintenance system 100 is located in the country and the terminal 10, the relay apparatus 30, the management system 50, or the program providing system 90 is located out of the country, the maintenance system 100 remotely maintains or manages at least one of the terminal 10, the relay apparatus 30, the management system 50, and the program providing system 90 via a communication network 2. Further, the maintenance system 100 performs maintenance including management of a model number, a serial number, a sale destination, a record of maintenance and inspection, a record of failure, or the like, of at least one of the terminal 10, the relay apparatus 30, the management system 50, and the program providing system 30 without using the communication network 2.

Further, the terminals (10aa, 10ab, 10ac, 10a . . . ), the relay apparatus 30a, and the router 70a are connected to each other and capable of communicating with each other via a LAN 2a. The terminals (10ba, 10bb, 10bc, 10b . . . ), the relay apparatus 30b, and the router 70b are connected to each other and are capable of communicating with each other via a LAN 2b. Further, the LAN 2a and the LAN 2b are connected to each other and capable of communicating with each other by a dedicated line 2ab including the router 70ab. The LAN 2a and the LAN 2b are included in a predetermined area A. For example, the area A is Japan, the LAN 2a is included in an office in Tokyo, and the LAN 2b is included in an office in Osaka.

Further, the terminals (10ca, 10cb, 10cc, 10c . . . ), the relay apparatus 30c, and the router 70c are connected to each other and capable of communicating with each other via a LAN 2c. The terminals (10da, 10db, 10dc, 10d . . . ), the relay apparatus 30d, and router 70d are connected to each other and are capable of communicating with each other via a LAN 2d. Further, the LAN 2c and the LAN 2d are connected to each other and capable of communicating with each other by a dedicated line 2cd including the router 70cd. The LAN 2c and the LAN 2d are included in a predetermined area B. For example, the area B is the United States, the LAN 2c is included in an office in New York, and the LAN 2d is included in an office in Washington D.C. The area A and the area B are connected to each other and capable of communicating with each other via the Internet 2i through the respective routers (70ab, 70cd).

Further, the management system 50 and the program providing system 90 are connected to the terminal 10 and the relay apparatus 30 and are capable of communicating with the terminal 10 and the relay apparatus 30 via the Internet 2i. The management system 50 and the program providing system 90 may be included in the area A or in the area B, or may be included in an area other than the areas A and B.

Further, the relay apparatus 30e is connected to the terminal 10 and capable of communicating with the terminal 10 via the Internet 2i.

It should be noted that the communication network 2 of the communication system 1 includes the LAN 2a, the LAN 2b, the dedicated line 2ab, the Internet 2i, the dedicated line 2cd, the LAN 2c, and the LAN 2d. The communication network 2 may include a place where not only wired communications but also wireless communications are performed.

Further, in FIG. 1, a set of four numbers indicated under each terminal 10, each relay apparatus 30, the management system 50, each router 70, the program providing system 90, and the maintenance system 100 illustrates a typical IP address of IPv4 in a simplified manner. For example, an IP address of the terminal 10aa is "1. 2. 1. 3". Further, instead of IPv4, IPv6 may be used. But for the sake of simplicity, IPv4 is used in the description.

<<Hardware Configuration of Communication System 1>>

Figure 2:
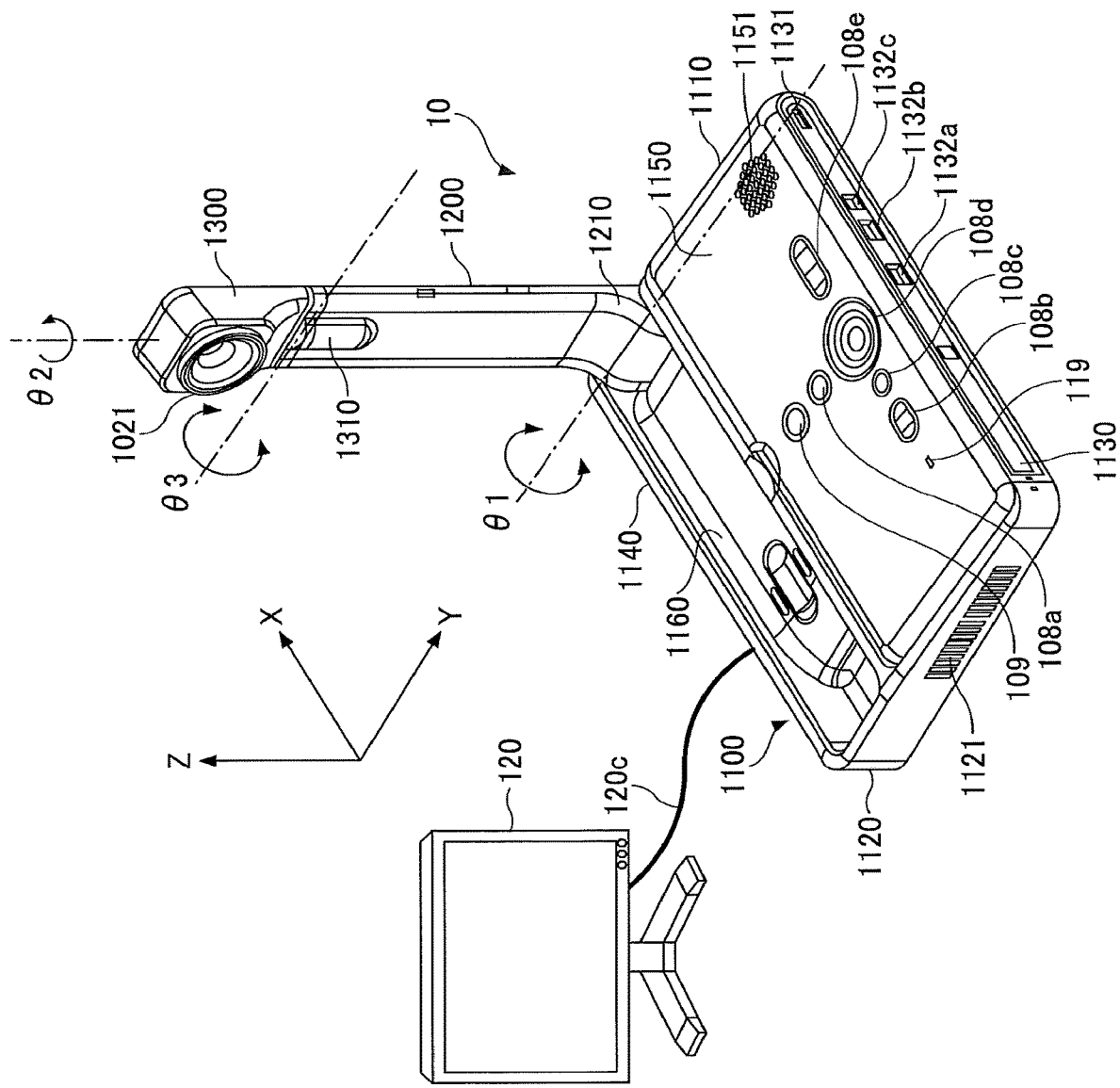
FIG. 2 is an external view of a communication terminal.

Next, a hardware configuration of the communication system 1 will be described. FIG. 2 is an external view of a terminal 10. In the following description, it is assumed that a longitudinal direction of the transmission terminal 10 is an X axis direction, a direction orthogonal to the X axis in a horizontal plane is a Y axis direction, and a direction orthogonal to the X axis direction and the Y axis direction (vertical direction) is a Z axis direction.

As shown in FIG. 2, the terminal 10 includes a housing 1100, an arm 1200, and a camera housing 1300. In a front wall 1110 of the housing 1100, there is an air intake surface (not shown) formed by a plurality of air intake holes, and, in a rear wall 1120 of the housing 1100, there is an air exhaust surface 1121 formed by a plurality of air exhaust holes. With the above arrangement, by driving a cooling fan embedded in the housing 1100, it is possible to take in air of the rear of the transmission terminal 10 through the air intake surface (not shown), and to exhaust the air to the rear of the terminal 10 through the air exhaust surface 1121. In a right side wall 1130 of the housing 1100, a sound pickup hole 1131 is formed, and, by using a built-in mike 114 which will be described later, sound such as voice, sound of things, noise, etc., can be picked up.

In the right wall 1130 side of the housing 1100, an operation panel 1150 is formed. In the operation panel 1150, there are a plurality of operation buttons (108a through 108e), a power supply switch 109, and an alarm lamp 119, which will be described later. Also, a sound output surface 1151 is formed in the operation panel 1150, which is formed by a plurality of sound output holes used for passing output sound from a built-in speaker 115 which will be described later. Further, in the left wall 1140 side of the housing 1100, a housing unit 1160 is formed as a concave portion for housing the arm 1200 and the camera housing 1300. In the right wall 1130 of the housing 1100, a plurality of connection ports (1132a through 1132c) are formed for electrically connecting cables for an external device connection interface 118 which will be described later. On the other hand, in the left wall 1140 of the housing 1100, a connection port (not shown) is formed for electrically connecting a cable 120c of a display 120 for the external device connection interface 118.

It should be noted that, in the following, any one of the operation buttons (108a through 108e) will be described as an "operation button 108", and any one of the connection ports (1132a through 1132c) will be described as a "connection port 1132".

Next, the arm 1200 is attached to the housing 1100 via a torque hinge 1210, and the arm 1200 is capable of rotating in an up-and-down direction within a range of tilt angle $\theta 1$ of 135 degrees with respect to the housing 1100. FIG. 2 illustrates a state in which the tilt angle $\theta 1$ is 90 degrees.

In the camera housing 1300, there is a built-in camera 112 which will be described later and is capable of taking images of a user, a document, a room, etc. Further, in the camera housing 1300, a torque hinge 1310 is formed. The camera housing 1300 is attached to the arm 1200 via the torque hinge 1310. Further, the camera housing 1300 is attached to the arm 1200 via the torque hinge 1310, and is capable of rotating in a right-and-left direction within a range of +/−180 degrees of pan angle $\theta 2$, and rotating in an up-and-down direction within a range of +/−45 degrees of tilt angle $\theta 3$, with respect to the arm 1200, assuming that FIG. 2 illustrates a state in which θ2 and θ3 are zero degrees.

It should be noted that, as another example, the terminal 10 may be a typical general-purpose computer, a mobile telephone terminal, etc. (refer to terminals (10ac, 10cc) of FIG. 1). In the case where a computer used for the terminal 10 does not include a mike and a camera, an external mike and an external camera may be connected to the computer. Further, in the case where the terminal 10 is a mobile telephone terminal, or the like, the terminal 10 may be connected to the Internet 2i through wireless communications utilizing a wireless LAN, a mobile telephone network, etc. With the above arrangement, a general-purpose computer or a mobile telephone terminal can be used as a terminal 10 according to an embodiment. Further, in the case where a general-purpose computer is used as a terminal 10, an application may be installed beforehand which causes the computer to perform processes of the terminal 10 which will be described later.

It should be noted that external views of the relay apparatus 30, the management system 50, the program providing system 90, and the maintenance system 100 are the same as those of typical server computers, and thus, descriptions of the external views will be omitted.

Figure 3:
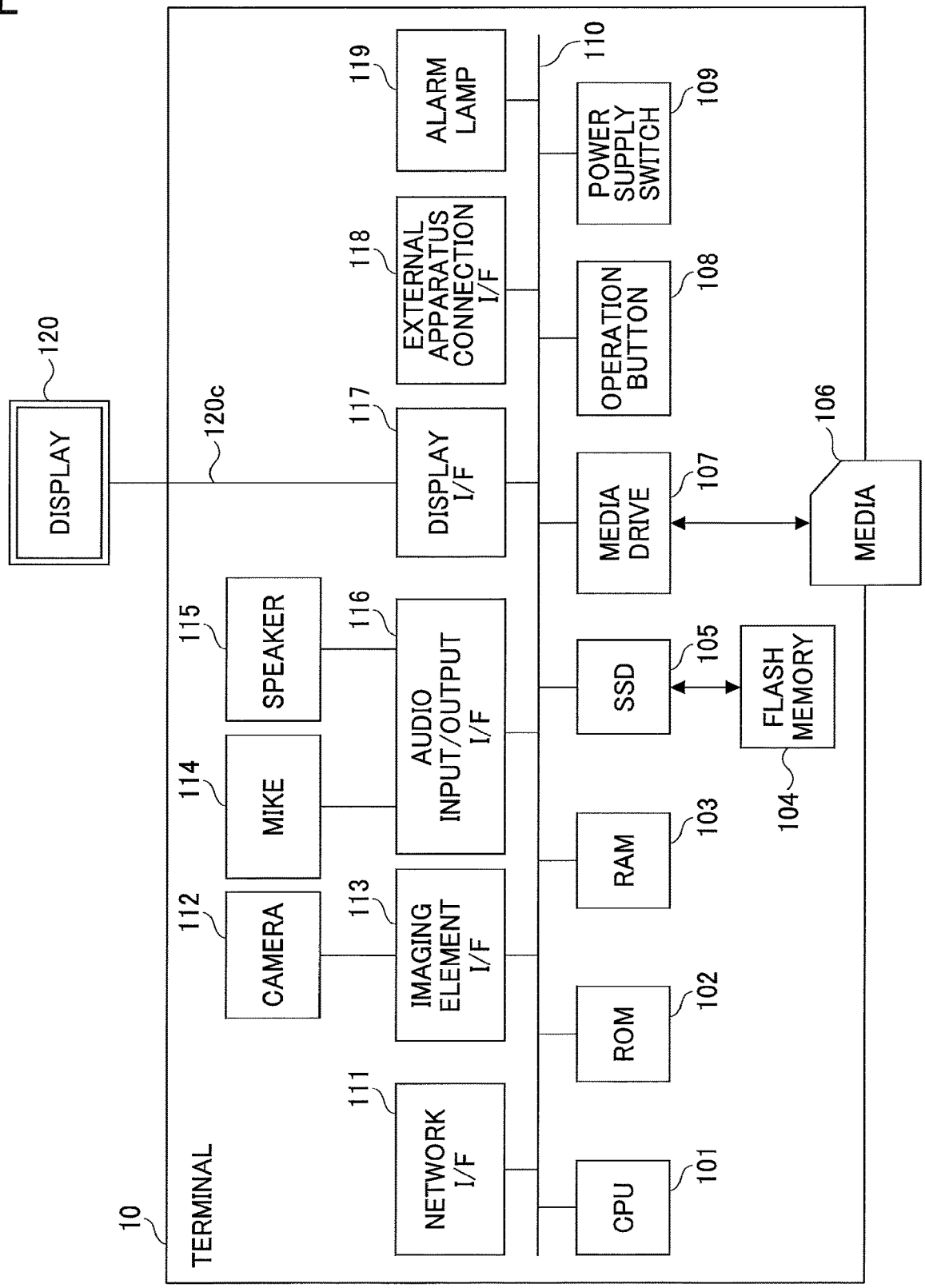
FIG. 3 is a hardware configuration diagram of the communication terminal.

FIG. 3 is a hardware configuration of a terminal 10 used in the communication system 1. As shown in FIG. 3, the terminal 10 includes a central processing unit (CPU) 101 for controlling overall operations of the terminal 10, a read only memory (ROM) 102 for storing a terminal program, a random access memory (RAM) 103 used as a work area of the CPU 101, a flash memory 104 for storing various data items including image data and audio data, a solid state drive (SSD) 105 for controlling writing and reading of the various data items to and from the flash memory 104 according to the control of the CPU 101, a media drive 107 for controlling writing and reading data to and from a recording medium 106 including a flash memory, operation buttons 108 operated for, for example, selecting a destination of the terminal 10, a power supply switch 109 for switching on/off the power supply of the terminal 10, and a network interface (I/F) 111 for performing data transmission by utilizing the communication network 2 which will be described later.

Further, the terminal 10 includes a built-in camera 112 which obtains image data by taking an image of a subject according to the control of the CPU 101, an imaging element I/F 113 which drives the camera 112, a built-in mike 114 for inputting sound, a built-in speaker 115 for outputting sound, a sound input/output I/F 116 for processing input/output of an audio signal between the mike 114 and the speaker 115 according to the control of the CPU 101, a display I/F 117 for transmitting image data to the external display 120 according to the control of the CPU 101, an external device connection I/F 118 for connecting various external devices, an alarm lamp 119 for indicating an error of various functions of the terminal 10, and a bus line 110 such as an address bus, a data bus, etc., for electrically connecting the above elements as shown in FIG. 3.

The display 120 is a display unit which includes a liquid crystal display or an organic electroluminescence (EL) display used for displaying an image of a subject, an operation icon, or the like. Further, the display 120 is connected to the display I/F 117 via the cable 120c. The cable 12c may be a cable for an analog RGB (VGA) signal, a cable for component video, or a signal cable for High-Definition Multimedia Interface (HDMI) (registered trademark) or Digital Video Interactive (DVI).

The camera 112 includes a lens and a solid-state image sensing device which is used for converting light into electricity and digitizing the subject image, and as the solid-state image sensing device, complementary metal oxide semiconductor (CMOS), charge coupled device (CCD), etc., are used.

To the external device connection I/F 118, via a Universal Serial Bus (USB) cable, or the like, which is inserted into the connection port 1132 of the housing 1100, external devices such as an external camera, an external mike, and an external speaker can be electrically connected. In the case where the external camera is connected, according to the control of the CPU 101, priority is given to the external camera to be driven over the built-in camera 112. Similarly, in the case where an external mike is connected or an external speaker is connected, according to the control of the CPU 101, priority is given to the external mike or the external speaker to be driven over the built-in mike 114 or the built-in speaker 115, respectively.

It should be noted that the recording medium 106 is detachable from the terminal 10. Further, it is not limited to the flash memory 104 that is used, and, Electrically Erasable and Programmable ROM (EEPROM), or the like may be used as long as it is a non-volatile memory to/from which data is written/read according to the control of the CPU 101.

Further, the terminal program may be recorded in a computer-readable recording medium (the recording medium 106, etc.) as a file of installable format or executable format, and may be distributed. Further, the terminal program may be stored not in the flash memory 104 but in the ROM 102.

Figure 4:
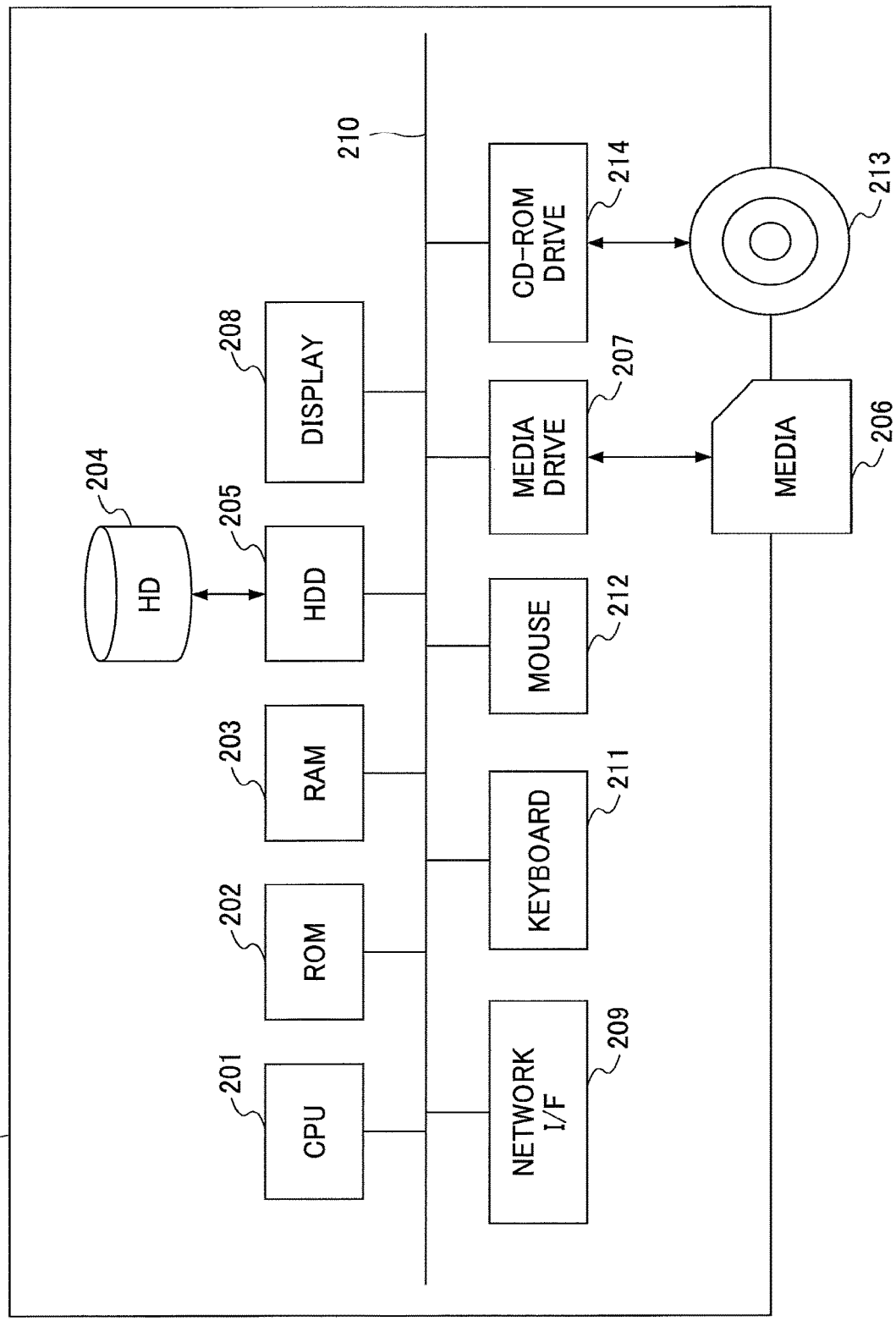
FIG. 4 is a hardware configuration diagram of a communication management system, a relay apparatus, a program providing system, or a maintenance system.

FIG. 4 is a hardware configuration of a management system 50 used in the communication system 1. The management system 50 includes a CPU 201 for controlling overall operations of the management system 50, a ROM 202 in which a communication management program is stored, a RAM 203 used for a work area of the CPU 201, a Hard Disk (HD) 204 for storing various data, a hard disk drive (HDD) 205 for controlling various data read and write of the HD 204 according to the control of the CPU 201, a media drive 207 for controlling data read and write (storage) of a recording medium 206 including a flash memory, a display 208 for displaying various information items including a cursor, a menu, a window, a character, or an image, a network I/F 209 for performing data communications by using the communication network 2, a keyboard 211 including a plurality of keys used for inputting a character, a numerical value, various instructions, etc., a mouse 212 for selecting and executing the various instructions, selecting a process target, moving the cursor, or the like, a CD-ROM drive 214 for controlling various data read and write of a Compact Disc Read Only Memory (CD-ROM) 213 as an example of a detachable recording medium, and a bus line 210 such as an address bus, a data bus, etc., for electrically connecting the above elements as shown in FIG. 4.

It should be noted that the communication management program may be recorded in a computer-readable recording medium including the recording medium 206 and the CD-ROM 213 as a file of installable format or executable format, and may be distributed.

Further, the relay apparatus 30, the program providing system 30, and the maintenance system 100 have similar hardware configurations as the above management system 50, and thus, the descriptions will be omitted. However, a relay apparatus program, a program providing system program, and a maintenance program for controlling the relay apparatus 30, the program providing system 90, and the maintenance system 100 are stored in the corresponding ROMs 202 of the relay apparatus 30, the program providing system 90, and the maintenance system 100. Also, in this case, each program may be recorded in a computer-readable recording medium including the recording medium 206 and the CD-ROM 213 as a file in an installable format or an executable format, and may be distributed.

<<Functional Structure of Communication System 1>>

Figure 5:
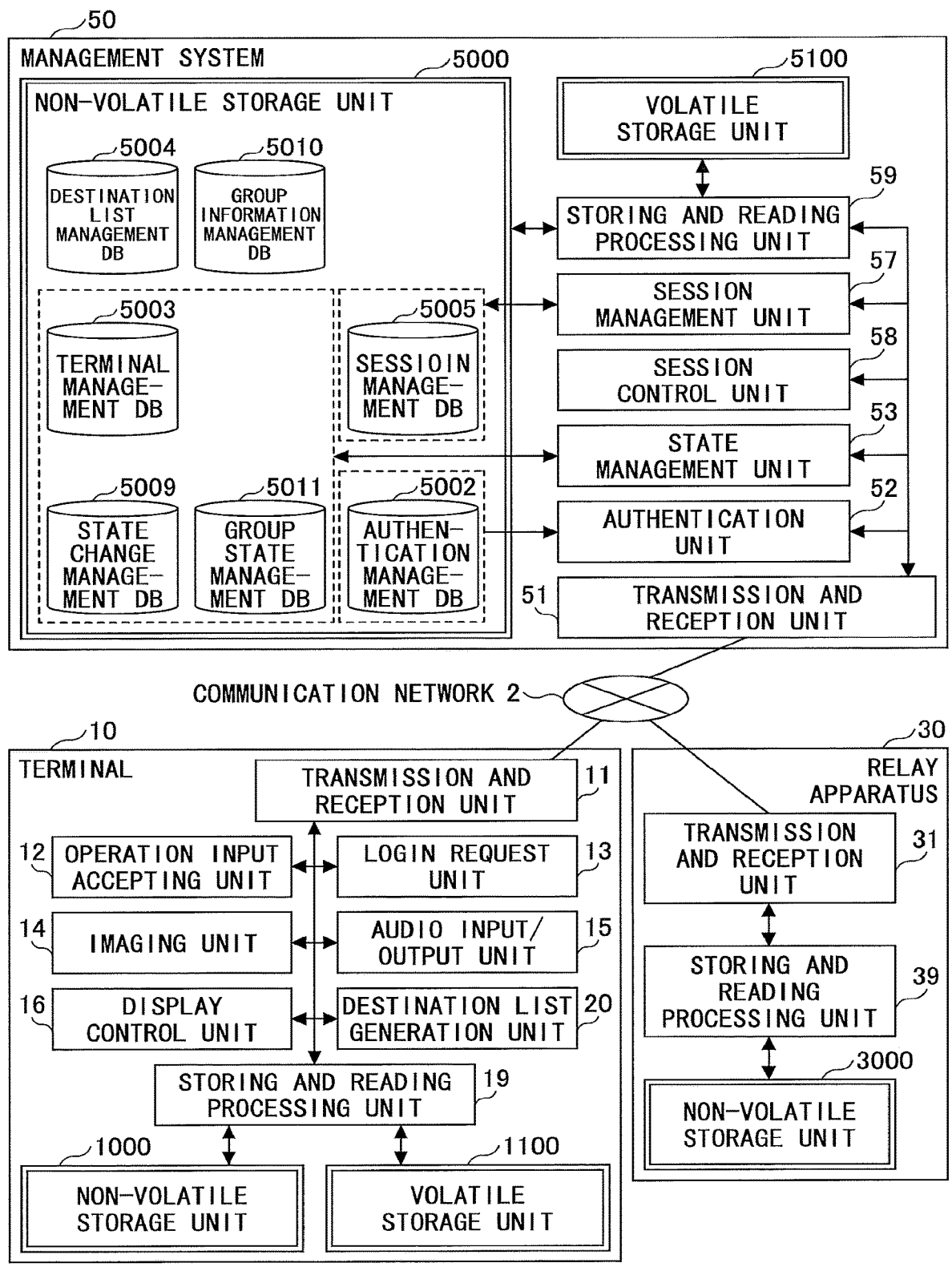
FIG. 5 is a functional block diagram of a terminal, an apparatus, and a system included in the communication system.

Next, a functional structure of the communication system 1 will be described. FIG. 5 is a functional block diagram of the terminal 10, the relay apparatus 30, and the management system 50 included in the communication system 1. In FIG. 5, the terminal 10, the relay apparatus 30, and the management 50 are connected to each other, and capable of performing data communications via the communication network 2. Further, the program providing system 90 and the maintenance system 100 shown in FIG. 1 are omitted in FIG. 5 because they are not directly related to video conference communications.

<Functional Structure of Terminal>

The terminal 10 includes a transmission and reception unit 11, an operation input accepting unit 12, a login request unit 13, an imaging unit 14, an audio input/output unit 15, a display control unit 16, a storing and reading processing unit 19, and a destination list generation unit 20. The above units are functions or means which are realized by any of the elements illustrated in FIG. 3 which operates according to instructions from the CPU 101 which executes programs stored in the ROM 102. Further, the terminal 10 includes a volatile storage unit 1100 including the RAM 103, and a non-volatile storage unit 1000 including the flash memory 104.

<Functional Units of Terminal>

Next, units of the terminal 10 will be described.

The transmission and reception unit 11 of the terminal 10 is realized by the network I/F 111, and performs transmitting and receiving data (or information) to and from other terminals, apparatuses, or systems via the communication network 2. For example, the transmission and reception unit 11 transmits start request information indicating a communication start request, participation request information indicating a request for participating in a session which has already been established, etc.

The operation input accepting unit 12 is realized by an operation button 108 and a power supply switch 109, and accepts various inputs from a user. For example, when the user turns on the power supply switch 109, the operation input accepting unit 12 accepts a power supply ON input, and turns on the power supply.

The login request unit 13 is realized by instructions from the CPU 101, and, upon accepting the power supply ON input, automatically transmits login request information indicating a login request and a current IP address of the terminal 10 from the communication unit 11 to the management system 50 via the communication network 2.

The imaging unit 14 is realized by instructions from the CPU 101, the camera 112, and the imaging element I/F 113, takes an image of a subject, and outputs the image data. The audio input/output unit 15 is realized by the audio input/output I/F 116, and, after a voice of a user is converted to an audio signal by the mike 114, audio data of the converted audio signal is input to the audio input/output unit 15. Further, the audio input/output unit 15 is realized by instructions from the CPU 101 and the audio input/output I/F 116, outputs the audio signal of the audio data to the speaker 115, and causes the voice to be output from the speaker 115.

The display control unit 16 is realized by the display I/F 117, and controls transmission of image data to the external display 120.

Further, the storing and reading processing unit 19 is realized by instructions from the CPU 101 and the SSD 105 illustrated as an example in FIG. 3, and performs processing of storing various data items in the non-volatile storage unit 1000 and reading the various data items stored in the non-volatile storage unit 1000. A communication identification (ID) for identifying the terminal 10 as a communication destination, a password, etc., are stored in the non-volatile storage unit 1000 Further, the storing and reading processing unit 19 also performs storing various data items in the volatile storage unit 1100 and reading the various data items stored in the volatile storage unit 1100. Content data received when communicating with a destination terminal is stored and overwritten to the volatile storage unit 1100 every time the content data is received. An image is displayed on the display 120 based on the image data prior to the overwrite, and audio is output from the speaker 115 based on the audio data prior to the overwrite.

The destination list generation unit 20 generates and updates a destination list illustrated in FIG. 12 in which states of destination candidates are indicated by icons based on destination list information which will be described later and state information of terminal 10 as a destination candidate which will be described later, which destination list information and state information are received from the management system 50.

(Functional Structure of Relay Apparatus)

Next, functions or means of the relay apparatus 30 will be described. The relay apparatus 30 includes a transmission and reception unit 31 and a storing and reading processing unit 39. The above units are functions or means which are realized by any of the elements illustrated in FIG. 4 which operates according to instructions from the CPU 201 which executes programs stored in the ROM 202. Further, the relay apparatus 30 includes a non-volatile storage unit 3000 including an HD 204 in which stored data and information are maintained even when the relay apparatus 30 is turned off.

<Functional Units of Relay Apparatus>

Next, a functional structure of the relay apparatus 30 will be described in detail. It should be noted that, in the following, when the functional units of the relay apparatus 30 are described, relations between the functional units and main elements used for realizing the functional units of the relay apparatus 30 will be also described.

The transmission and reception unit 31 of the relay apparatus 30 is realized by the network I/F 209, and performs transmitting and receiving data (or information) to and from other terminals, apparatuses, or systems via the communication network 2. Further, the storing and reading processing unit 39 is realized by instructions from the CPU 201 and the HDD 205 illustrated as an example in FIG. 3, and performs storing various data items in the non-volatile storage unit 3000 and reading the various data items stored in the non-volatile storage unit 3000.

<Functional Structure of Management System>

Next, functions or means of the management system 50 will be described. The management system 50 includes a transmission and reception unit 51, an authentication unit 52, a state management unit 53, a session management unit 57, a session control unit 58, and a storing and reading unit 59. The above units are functions or means which are realized by any of the elements which operates according to instructions from the CPU 201 which executes programs stored in the ROM 202. Further, the management system 50 includes a non-volatile storage unit 5000 including the HD 204 in which stored data and information are maintained even when the management system 50 is turned off. Further, the management system 50 includes a volatile memory unit 5100 including the RAM 203.

(Terminal Management Table)

Further, in the non-volatile storage unit 5000, a terminal management DB 5003 including a terminal management table as illustrated in FIG. 6B is included. It should be noted that FIG. 6B is a conceptual diagram illustrating a terminal management table. In the terminal management table, each of communication IDs of terminals 10 is associated with a destination name (terminal name), an operational state of the terminal 10, a communication state indicating a communication state with another terminal, and an IP address of the terminal 10, and the associated result is stored. Here, the operational state includes "ONLINE" where the power supply is turned on and communications are available or communications are being provided, and "OFFLINE" where communications are not available including a state where the power supply is turned off.

According to an embodiment, the communication ID is information used for identifying a transmission destination (communication destination) or a transmission source (communication source) of content data in a content data session. The communication ID includes, for example, information for identifying the terminal 10, information identifying a user of the terminal 10, and information identifying a group which includes multiple terminals 10. In the following, a case will be described in which the communication ID is information used for identifying a terminal 10.

It should be noted that the communication ID and the relay apparatus ID used in the communication system 1 indicate identification information items used for uniquely identifying a terminal 10 and uniquely identifying a relay apparatus 30, respectively, including a language, a character, a symbol, or various marks. Further, the communication ID and the relay apparatus ID may be identification information in which at least two of a language, a character, a symbol, and various marks are combined.

(Destination List Management Table)

Further, in the non-volatile storage unit 5000, a destination list management DB 5004 including a destination list management table as illustrated in FIG. 6C is included. It should be noted that FIG. 6C is a conceptual diagram illustrating the destination list management table. In the destination list management table, a communication ID, used for identifying a communication start request source in a session used for transmitting content data between the terminals 10, is associated with a communication ID used for identifying a candidate which is available for being specified as a communication destination, and the associated result is stored.

(Session Management Table)

Further, in the storage unit 5000, a session management DB 5005 including a session management table as illustrated in FIG. 6D is included. It should be noted that FIG. 6D is a conceptual diagram illustrating the session management table. In the session management table, each session ID used for identifying a session for transmitting content data between the terminals 10 is associated with a relay apparatus ID of a relay apparatus 30 which relays the content data between the terminals 10 and communication IDs of the terminals 10 which serve as a transmission destination or a transmission source of the content data in the session, and the associated result is stored.

(State Change Management Table)

Further, in the non-volatile storage unit 5000, a state change management DB 5009 including state change management tables as illustrated in FIG. 7A and FIG. 7B is included. It should be noted that FIG. 7A and FIG. 7B are conceptual diagrams illustrating the state change management tables. In a state change management table (A) in FIG. 7A, management information used for controlling a session between the terminals 10 is associated with before-change state information indicating a communication state before being changed by the state management unit 53 which will be described later, and change information indicating a communication state after changed by the state management unit 53, and the associated result is stored. Further, in a state change management table B in FIG. 7B, management information is associated with terminal information used for identifying any one of a start request terminal and a destination terminal, before-change state information, and change information, and the associated result is stored.

It is illustrated in the state change management table (B) in FIG. 7B that, in the case where management information "Private Invite" is generated, the management system 50 changes a before-change communication state "None" of the start request terminal to "Private Calling", and changes a before-change communication state "None" of the destination terminal to "Private Ringing". It should be noted that the management information includes "Invite", "Private Invite", and "Accept" as illustrated in FIG. 7B, and "Join", "Call", "Leave", etc., as illustrated in FIG. 7A.

"Invite" is management information generated in accordance with a communication start request. "Accept" is management information, generated in accordance with a response to the start request, indicating permitting a communication start or a session establishment. "Join" is management information, generated in accordance with the session establishment, indicating a start request for relaying content data. "Call" is management information indicating a request for participation in a being-established session. "Leave" is management information indicating a request for ending a session.

(Group Information Management Table)

In the non-volatile storage unit 5000, a group information management DB 5010 including a group information management table as illustrated in FIG. 7C is included. It should be noted that FIG. 7C is a conceptual diagram illustrating the group information management table. In the group information management table, each communication ID is associated with group information indicating whether the communication ID is a group ID, a group name identified by the group ID, and communication IDs of terminals 10 included in the group, and the associated result is maintained. In other words, the group ID is used for defining a set of one or more communication IDs. In the destination list, a group ID is processed in the same way as a communication ID.

As illustrated in FIG. 7C, in the case where a communication ID is a group ID, "TRUE" is set in the group information, and further, communication IDs of terminals 10 included in a group and a group name are set in corresponding fields. On the other hand, in the case where a communication ID is not a group ID, "FALSE" is set in the group information.

(Group State Management Table)

In the non-volatile storage unit 5000, a group state management DB 5011 including a group state management table as illustrated in FIG. 7D is included. It should be noted that FIG. 7D is a conceptual diagram illustrating the group state management table. In the group state management table, each communication ID of a group is associated with an operational state of the group, and the associated result is stored.

(Functional Units of Management System)

Next, functional units of the management system 50 will be described in detail. It should be noted that, in the following, when functional units of the management system 50 is described, relations between functional units and main elements of the elements illustrated in FIG. 4, which are used for realizing the functional units of the management system 50, will be also described.

The transmission and reception unit 51 is realized by the network I/F 209, and performs transmitting and receiving data (or information) to and from other terminals, apparatuses, or systems via the communication network 2. The authentication unit 52 performs authentication by searching an authentication management table (refer to FIG. 6A) by using as search keys a communication ID and a password included in login request information received via the transmission and reception unit 51, and by determining whether the same communication ID and the password are stored in the authentication management table.

Figure 8:
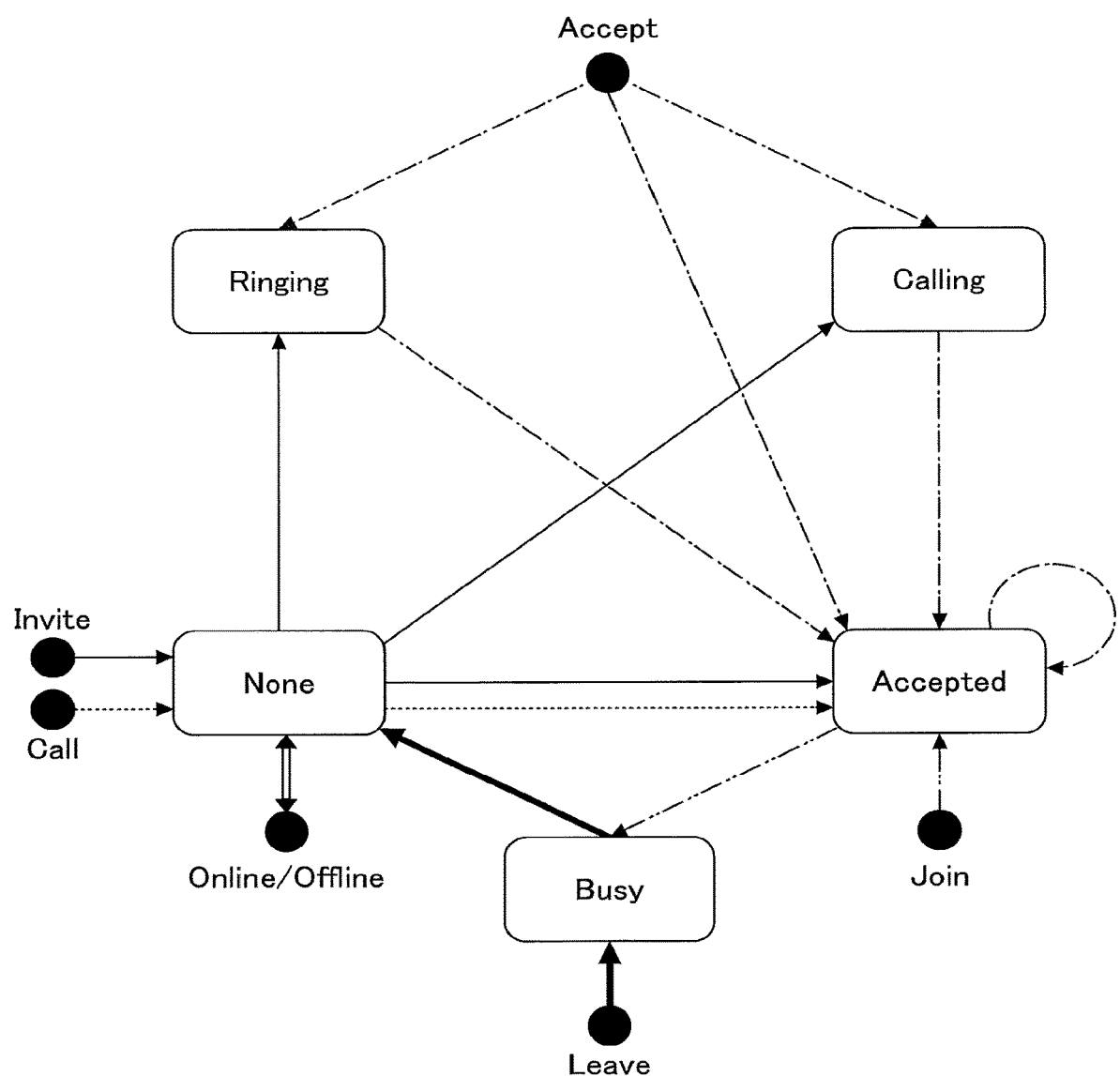
FIG. 8 is a state transition diagram of communication states.
Figure 9:
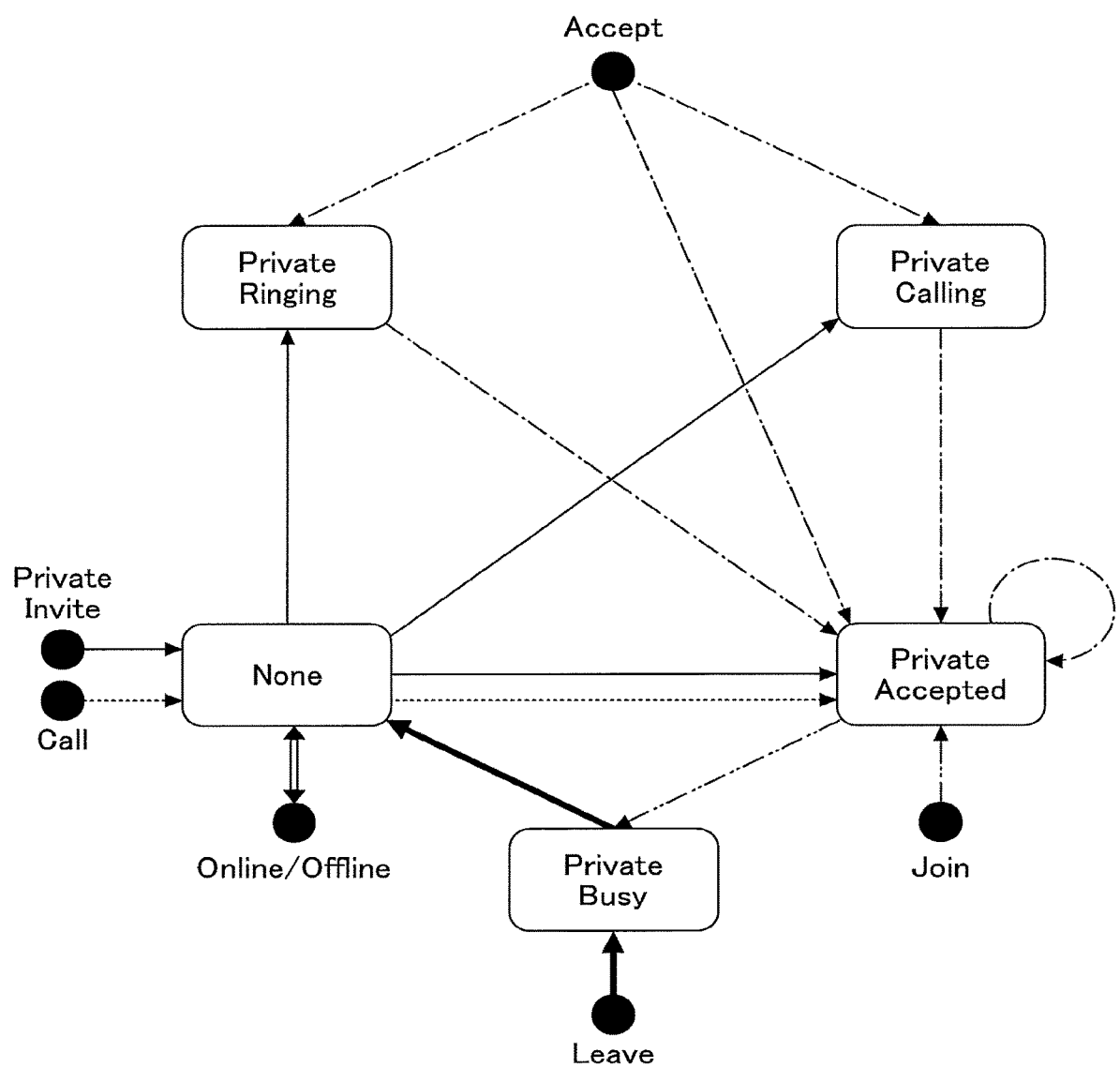
FIG. 9 is a state transition diagram of communication states.

The state management unit 53 stores operational states and communication states in the terminal management table illustrated in FIG. 6B according to instructions from the CPU 201. FIG. 8 and FIG. 9 are state transition diagrams illustrating communication states of a terminal 10 according to an embodiment. The state management unit 53 changes the communication state of the user terminal 10 according to communication state change rules (refer to FIG. 8 and FIG. 9) obtained by referring to the state change management table (A) and the state change management table (B) illustrated in FIG. 7A and FIG. 7B.

For example, in the case where management information "Accept" is received by the management system 50, the state management unit 53 changes the communication state of the terminal 10 from "Private Ringing" or "Private Calling" to "Private Accepted" as illustrated in FIG. 9. On the other hand, in the case where the communication state of the terminal 10 is "Private Accepted", the state management unit 53 maintains (or does not change) the communication state "Private Accepted" as illustrated in FIG. 9.

In the communication system 1, an example is described in which the state change management tables (refer to FIG. 7A and FIG. 7B) are used for defining the state change rules used by the state management unit 53. However, the defining method is not limited to this example. Here, it is only necessary that the management system program is programmed in such a way that the state management unit 53 can change the communication state according to the communication state transition rules illustrated in the state transition diagrams in FIG. 8 and FIG. 9.

The session management unit 57 controls a session used for transmitting content data between the terminals 10 by storing various information items in the session management table (refer to FIG. 6D) or reading the information items from the session management table according to instructions from the CPU 201.

The session control unit 58 controls a session for transmitting content data between the terminals 10 according to instructions from the CPU 201. The above controlling includes establishing a session, causing a terminal 10 to participate in the established session, disconnecting the session, etc. Specifically, the session management unit 57 performs generating a session ID used for identifying the session, selecting a relay apparatus 30 used for relaying content data in the session, etc.

Further, the storing and reading processing unit 59 is realized by instructions from the CPU 101 and, as an example, the HDD 205, and performs storing various types of data items in the non-volatile storage unit 5000 or the volatile storage unit 5100, and reading the various types of data items stored in the non-volatile storage unit 5000 or the volatile storage unit 5100.

<<Processes and Operations of Communication System 1>>

Figure 10:
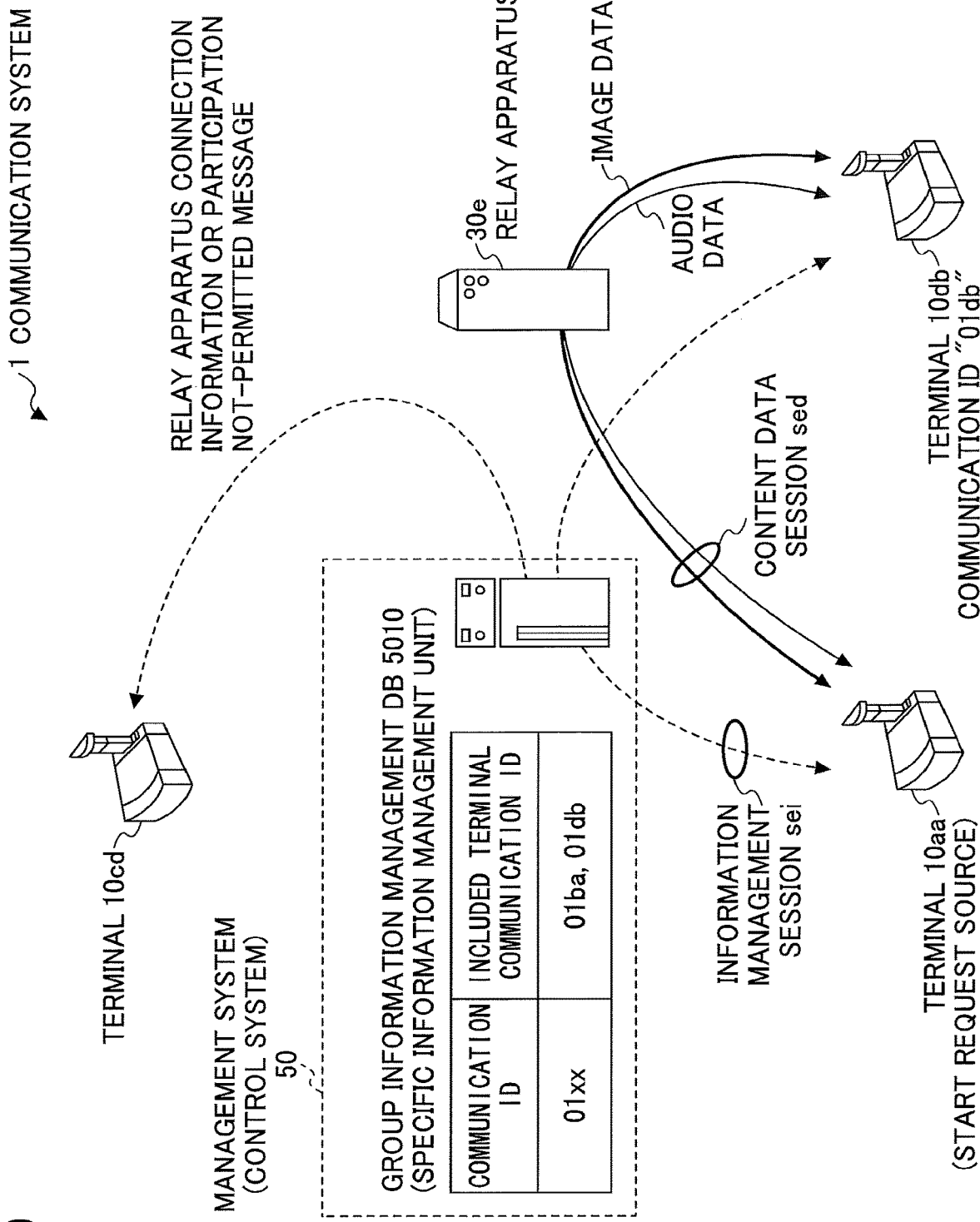
FIG. 10 is a conceptual diagram illustrating content data and states of transmission and reception of various types of management information items in the communication system.

The configuration and functions (or units) of the communication system 1 have been described above. Next, processing methods of the communication system 1 will be described. First, referring to FIG. 10, overall processes and operations of the communication system 1 will be described. FIG. 10 is a conceptual diagram illustrating content data and states of transmission and reception of various types of management information items in the communication system 1.

As illustrated in FIG. 10, in the communication system 1, a management information session sei for transmitting and receiving various types of management information items is established between the terminals 10 via the management system 50, or, established between the terminal 10 and the management system 50. Further, between the terminals 10, sessions are established for transmitting and receiving content data (image data and audio data) via the relay apparatus 30. Here, the sessions are collectively indicated as a content data session sed. In other words, the content data session sed is used for a video conference.

The management system 50 (an example of a control system) of the communication system 1 controls, when the content data session sed used for transmitting content data (an example of information) between the terminals 10 has been established, participation of another terminal 10 in the session.

Here, in the case where the content data session sed has been established between the terminals (10*aa*, 10*db*) based on a communication start request in which a communication ID "01xx" (an example of a first destination) is specified as a destination by the terminal 10*aa* as a communication start request source, the transmission and reception unit 51 (an example of a participation control unit) of the management system 50 rejects the participation of a terminal 10*cd* (an example of another terminal) in the session by transmitting a participation-not-permitted message to the terminal 10*cd*. On the other hand, in the case where the content data session sed has been established between the terminals (10*aa*, 10*db*) based on a communication start request in which a communication ID "01db" (an example of a second destination) is specified as a destination by the terminal 10*aa* as a communication start request source, the transmission and reception unit 51 permits the participation of the terminal 10*cd* (an example of another terminal) in the session by transmitting relay apparatus connection information to the terminal 10*cd*. With the above arrangement, it is possible for the terminal 10*aa* to avoid selecting between limited participation and unlimited participation every time when the terminal 10*aa* requests a communication start, and thus, load of a user is reduced.

In the terminal management DB 5003 (an example of a state information management unit) of the management system 50, when the content data session sed has been established based on a communication start request in which the communication ID "01xx" is specified, each of the terminals (10*aa*, 10db) participating in the session is associated with a communication state "Private Busy" (an example of first state information), and the associated result is stored. Further, in the terminal management DB 5003 of the management system 50, when a content data session sed has been established based on the communication start request in which the communication ID "01db" is specified, each of the terminals (10*aa*, 10*db*) participating in the session is associated with a communication state "Busy" (an example of second state information), and the associated result is stored. In the case where a request from a terminal 10*cd* for participating in the content data session sed in which terminals 10 associated with state information "Private Busy" in the terminal management DB 5003 are participating is received, the transmission and reception unit 51 rejects the participation of the terminal 10*cd* in the session by transmitting a participation-not-permitted message to the terminal 10*cd*. In the case where a request from a terminal 10*cd* for participating in the content data session sed in which terminals 10 associated with state information "Busy" in the terminal management DB 5003 are participating is received, the transmission and reception unit 51 permits the participation of the terminal 10*cd* in the session by transmitting relay apparatus connection information to the terminal 10*cd*. As described above, it is possible to control participation according to the destination by controlling the state of the terminal 10 according to the destination.

It should be noted that the communication ID "01xx" is a destination indicating a call center (an example of a group) including a plurality of terminals (10*ba*, 10*db*), and the communication ID "01db" is a destination indicating a terminal 10*db* included in the call center. With the above arrangement, it is possible to reject participation of another terminal 10 in a content data session sed established by specifying a call center as a destination.

In a group information management DB 5010 (an example of a group management unit), for each communication ID indicating a group, communication IDs (example of terminal identification information) used for identifying terminals 10 included in the group are stored. The transmission and reception unit 51 (an example of a start request accepting unit) receives a communication start request specifying a destination from a terminal 10 as a communication start request source. When the communication start request specifying a communication ID of a group is received by the transmission and reception unit 51, the session control unit 58 (an example of a selection unit) selects, from communication IDs of terminals associated with the specified communication ID of a group in the group information management DB 5010, a communication ID of at least one terminal 10 as a communication counterpart, or, a terminal to be called, for the terminal 10 as a communication start request source. With the above arrangement, it is possible for the management system 50 to select a terminal to be called when a communication start request specifying a group as a destination is received.

A specific information management unit (an example of a group information management DB 5010) stores a destination, of a plurality of destinations, which is specified by group information "TRUE" (an example of specifying information) used for determining that the destination indicates a group. When a communication start request specifying a destination with group information "TRUE" indicating a group is received by the transmission and reception unit 51, the session control unit 58 selects the at least one terminal 10 as a communication counterpart of the terminal 10 as the communication start requesting source. With the above arrangement, it is possible for the management system 50 to select a terminal to be called when a communication start request specifying a group as a destination is received.

Figure 11:
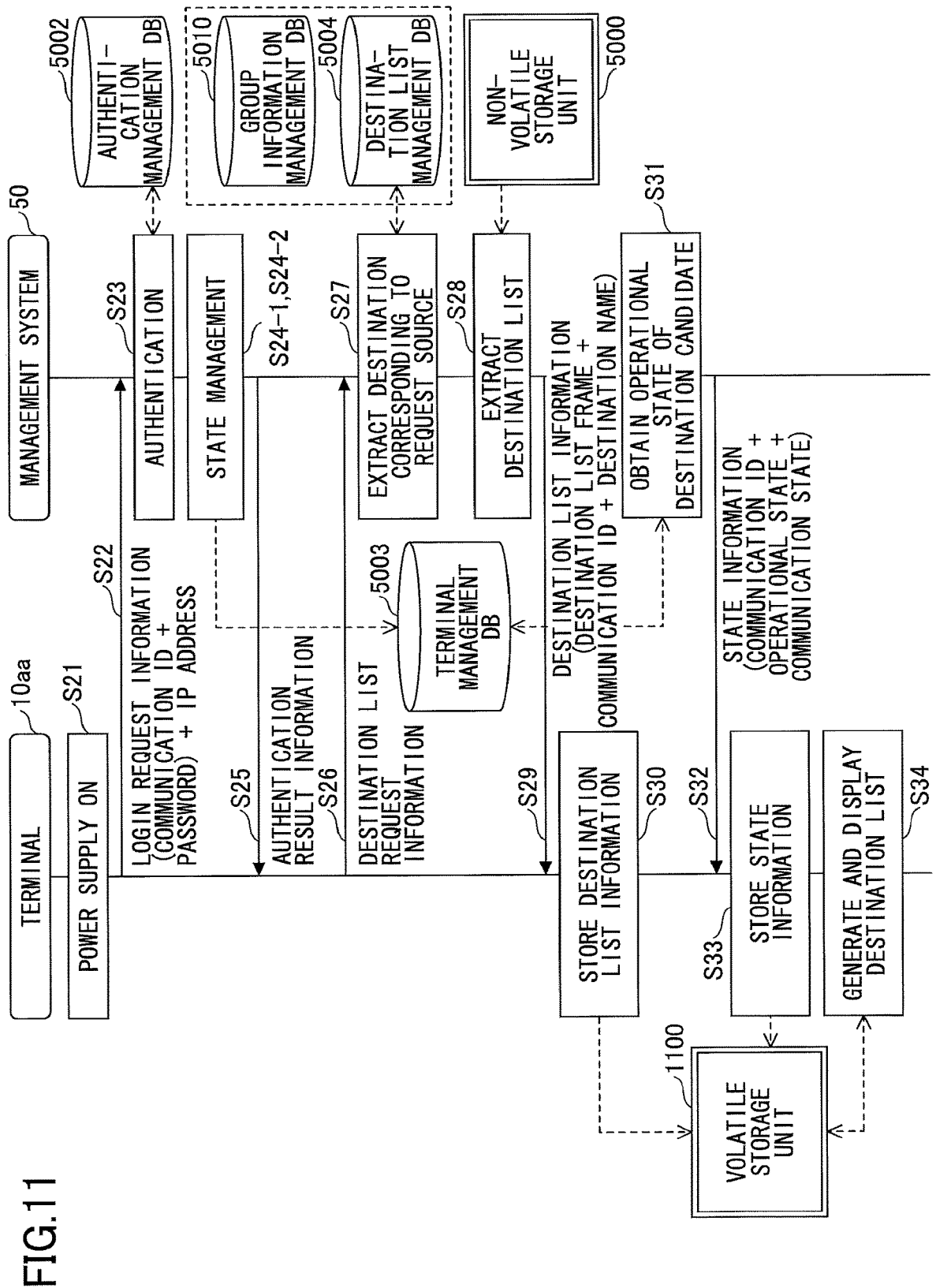
FIG. 11 is a sequence diagram illustrating preparation stage processing for starting communications between transmission terminals.

Next, referring to FIG. 11, transmission and reception processing of various types of management information items in a preparation stage before the communication start of the terminal 10*aa* will be described. FIG. 11 is a sequence diagram illustrating preparation stage processing for starting communications between terminals. It should be noted that processes are illustrated in FIG. 11 in which various types of management information items are transmitted and received via a management information session sei.

First, when a user of the terminal 10*aa* turns on the power supply switch 109, the operation input accepting unit 12 receives a power supply ON input, and turns on the power supply (step S21). Next, triggered by the reception of the power supply ON input, the login request unit 13 automatically transmits login request information indicating a login request to the transmission management system 50 from the transmission and reception unit 11 via the communication network 2 (step S22). The login request information includes a communication ID used for identifying the terminal 10*aa* as a request source, and a password. The communication ID and the password have been read from the non-volatile storage unit 1000 via the storing and reading processing unit 19 and transmitted to the transmission and reception unit 11. It should be noted that, when the login request information is transmitted from the terminal 10*aa* to the management system 50, the management system 50 as a receiver can obtain an IP address of the terminal 10*aa* as a transmitter.

Next, the authentication unit 52 of the management system 50 performs authentication by searching the authentication management table (refer to FIG. 6A) by using as search keys the communication ID and the password included in the login request information received via the transmission and reception unit 51, and by determining whether the same communication ID and the password are stored in the authentication management DB 5002 (step S23).

In the case where it is determined that the same communication ID and the password are stored and that the login request is from a terminal 10 that has a proper use permission, the state management unit 53 stores in a terminal management table (refer to FIG. 6B) a record in which the communication ID and the terminal name of the terminal 10*aa* are associated with an IP address of the terminal 10*aa* (step S24-1). With the above arrangement, in the terminal management table illustrated in FIG. 6B, the communication ID "01aa" is associated with the terminal IP address "1.2.1.3", and the associated result is stored.

Next, the state management unit 53 sets "ONLINE" in the operational state of the terminal 10*aa*, and sets "None" in the communication state, and a record is stored in the terminal management table (refer to FIG. 6B) in which record the communication ID and the terminal name of the terminal 10*aa* are associated with the set operational state and the communication state (step S24-2).

Next, the transmission and reception unit 51 of the management system 50 transmits authentication result information indicating the authentication result obtained by the authentication unit 52 to the login request terminal (terminal 10*aa*) as a login request source via the communication network 2 (step S25).

When the authentication result information indicating a determination result that the login request terminal has a proper use permission is received, the transmission and reception unit 11 of the terminal 10*aa* transmits destination list request information indicating a request for a destination list to the management system 50 via the communication network 2 (step S26). As a result, the transmission and reception unit 51 of the management system 50 receives the destination list request information.

Next, the storing and reading processing unit 59 searches the destination list management table (refer to FIG. 6C) by using as a search key the communication ID "01aa" of the login request terminal (terminal 10aa) that has requested login, and reads communication IDs ("01xx", "01ab", etc.) of destination candidates which can be specified by the login request terminal (terminal 10aa) (step S27). Further, the storing and reading processing unit 59 searches the terminal management table (refer to FIG. 6B) and the group information management table (refer to FIG. 7C) by using the read communication IDs ("01xx", "01ab", etc.) as search keys, and reads destination names ("CALL CENTER", "CUSTOMER: TOKYO OFFICE AB TERMINAL", etc.) corresponding to the communication IDs.

Next, the transmission and reception unit 51 of the management system 50 reads data in a destination list frame (data in a destination list frame 1100-1 illustrated in FIG. 12) from the non-volatile storage unit 5000 via the storing and reading processing unit 59 (step S28), and transmits destination list information (destination list frame, communication ID, destination name) including the destination list frame, and the communication IDs and the destination names of the destination candidates read by the storing and reading processing unit 59 to the start request terminal (terminal 10aa) (step S29). As a result, the destination list information is received by the transmission and reception unit 11 of the start request terminal (terminal 10aa), and the destination list information is stored in the volatile storage unit 1100 by the storing and reading processing unit 19 (step S30).

Further, the storing and reading processing unit 59 of the management system 50 searches the terminal management table (refer to FIG. 6B) and the group information management table (refer to FIG. 7D) by using the communication IDs ("01ab", etc.) of the destination candidates as search keys, and reads operational states and communication states corresponding to the communication IDs (step S31).

Next, the transmission and reception unit 51 transmits state information including the communication IDs used as search keys in step S31, the operational states and communication states of the corresponding destination candidates to the login request terminal (terminal 10aa) via the communication network 2 (step S32).

Next, the storing and reading processing unit 19 of the login request terminal (terminal 10aa) stores in order the state information items received from the management system 50 in the volatile storage unit 1100 (step S33). As a result, it is possible for the login request terminal (terminal 10aa) to receive the state information of each terminal, and to obtain the current operational state and communication state of the call center, the terminal 10ab, etc., as destination candidates with which the login request terminal (terminal 10aa) as a start request terminal is able to communicate.

Next, the destination list generation unit 20 of the login request terminal (terminal 10aa) generates a destination list in which operational states and communication states of the terminals 10 as destination candidates are reflected based on the destination list information stored in the volatile storage unit 1100 and the state information items of the terminals. Further, the display control unit 16 displays the destination list on the display 120aa at a predetermined timing (step S34).

Figure 12:
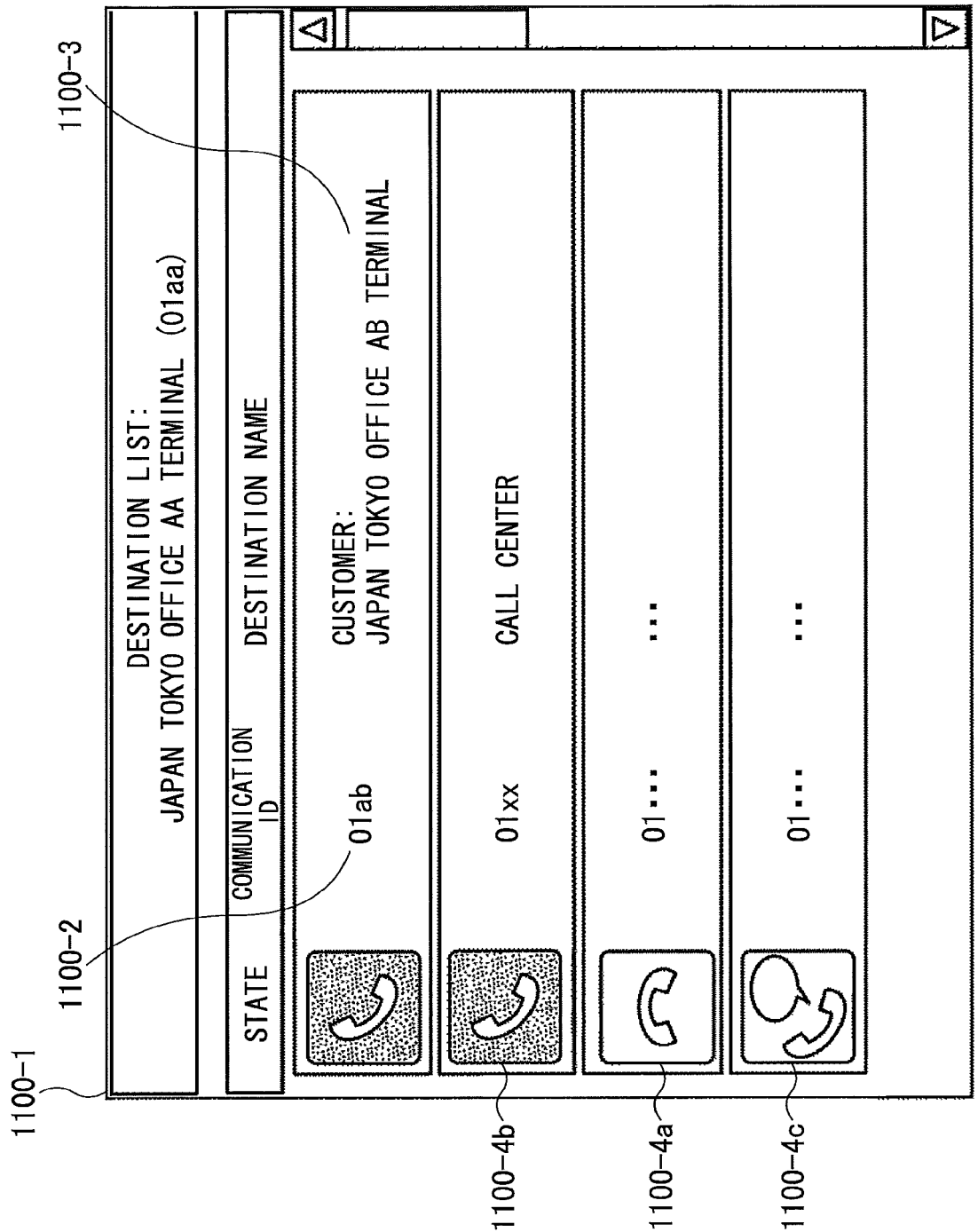
FIG. 12 is a drawing illustrating a display example of a destination list.

FIG. 12 is a drawing illustrating a display example of the destination list. As illustrated in FIG. 12, the destination list includes a destination frame 1100-1, communication IDs 1100-2, the terminal names 1100-3, and state information reflecting icons 1100-4a through 1100-4c of the destination candidates, etc.

The destination list generation unit 20 assigns a communication available icon 1100-4b to a destination candidate in the case where an operational state of the destination candidate is "ONLINE (COMMUNICATION AVAILABLE)". Further, the destination list generation unit 20 assigns a talking icon 1100-4c to a destination candidate in the case where an operational state of the destination candidate is "ONLINE (TALKING)". Further, the destination list generation unit 20 assigns an OFFLINE icon 1100-4a to a destination candidate in the case where an operational state of the destination candidate is "OFFLINE".

Figure 13:
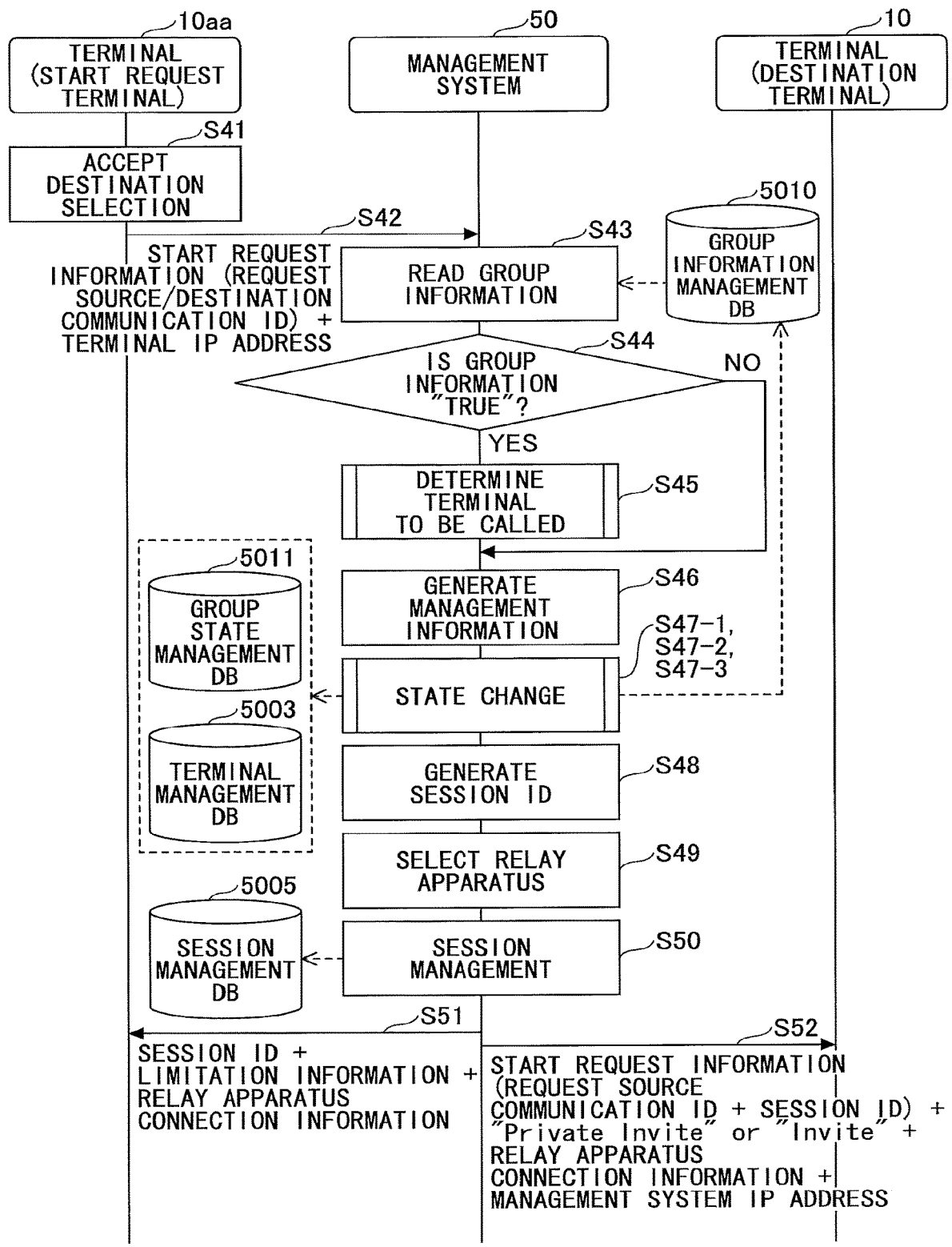
FIG. 13 is a sequence diagram illustrating a communication start requesting process.

Next, referring to FIG. 13, a process will be described in the case where the terminal 10aa requests a communication start with another terminal. FIG. 13 is a sequence diagram illustrating a communication start requesting process. It should be noted that, in FIG. 13, a process is illustrated in which various types of management information items are transmitted and received via the management information session sei.

It is possible for the terminal 10aa as a start request terminal to request a communication start by selecting, from the destination candidates displayed in the destination list frame 1100-1, at least one destination candidate whose operational state is "ONLINE", or, the destination candidate identified by a communication ID ("01ab", "01xx", etc.).

In the process illustrated in FIG. 13, first, when a user of the start request terminal selects a desired destination candidate and presses the operation button 108, the operation input accepting unit 12 receives the selected destination candidate (step S41). Next, the transmission and reception unit 11 of the terminal 10aa transmits, together with an IP address of the start request terminal, start request information including the communication ID "01aa" of the start request terminal (terminal 10aa) and the communication ID of the destination candidate to the management system 50 (step S42). As a result, the transmission and reception unit 51 of the management system 50 receives the start request information, and obtains an IP address "1. 2. 1. 3" of the start request terminal (terminal 10aa) as a transmission source.

Next, the storing and reading processing unit 59 searches the group information management table (refer to FIG. 7D) by using as a search key the communication ID included in the start request information, and reads corresponding group information (step S43). Next, the session control unit 58 determines whether the group information read in step S43 is "TRUE" (step S44).

In the case where it is determined in step S44 that the group information is "TRUE", the session control unit 58 determines a terminal 10 to be called (a terminal to be called) as a communication counterpart of the terminal 10aa from the terminals 10 included in a group selected as the destination candidate of the start request terminal (terminal 10aa).

Figure 14:
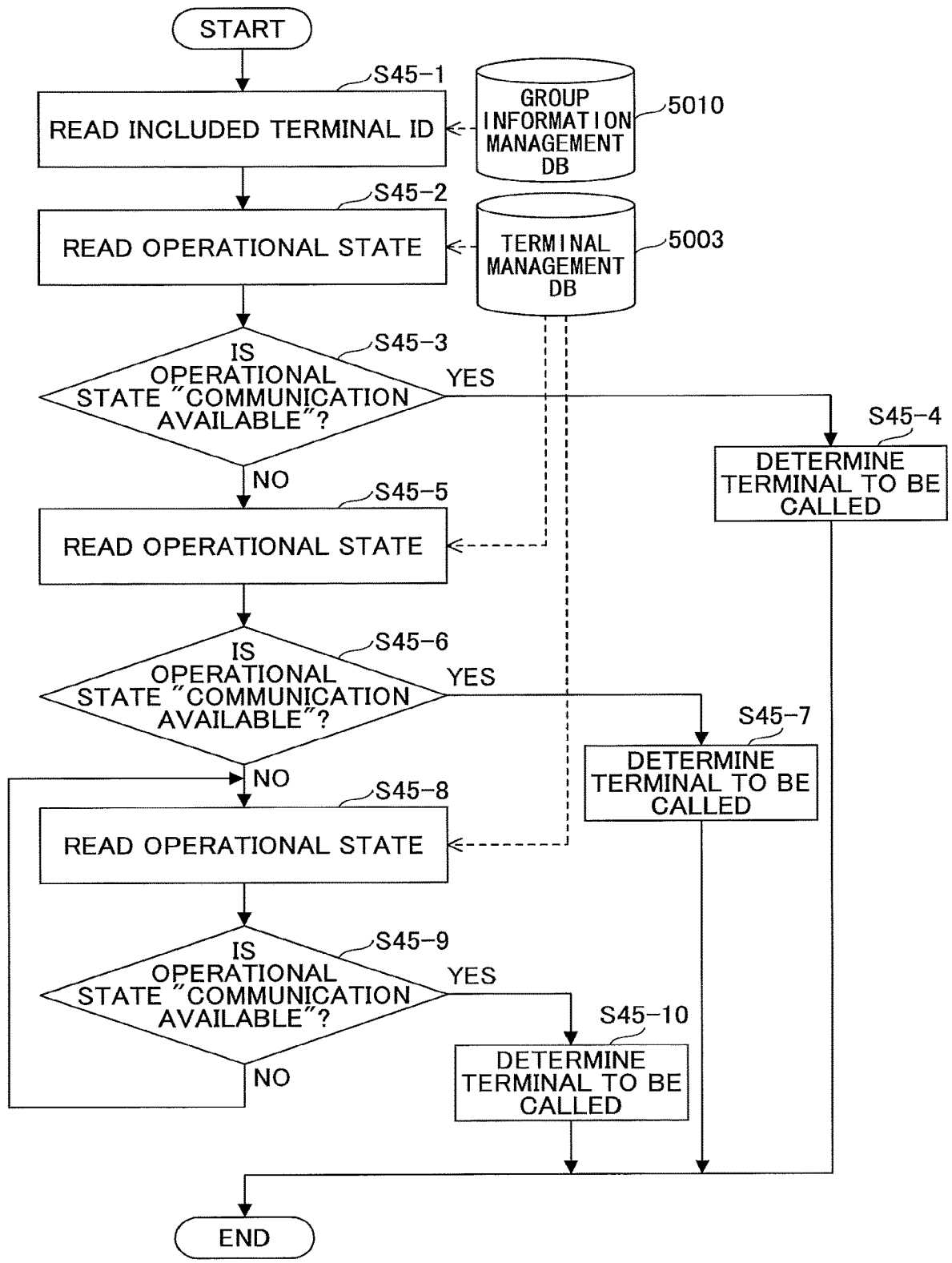
FIG. 14 is a flowchart illustrating a process of determining a terminal to be called.

The process of step S44 will be described in detail by referring to FIG. 14. FIG. 14 is a flowchart illustrating a process of determining a terminal to be called. First, the storing and reading processing unit 59 searches the group information management table (refer to FIG. 7D) by using as a search key the communication ID (e.g., "01xx") of the destination candidate included in the start request information, and reads communication IDs of terminals 10 included in the corresponding group (step S45-1). In the following, the description will be continued in the case where communication IDs ("01ba", "01db") are read in step S45-1.

Next, the state management unit 53 searches the terminal management table (refer to FIG. 6B) by using as a search key an arbitrarily selected first communication ID (e.g., "01ba") selected from the communication IDs ("01ba", "01db") read in step S45-1, and reads corresponding operational state (step S45-2).

Next, the session control unit 58 determines whether the operational state read in step S45-2 is "ONLINE (COMMUNICATION AVAILABLE)" (step S45-3). In the case where it is determined that the operational state is "ONLINE (COMMUNICATION AVAILABLE)" in step S45-3, the session control unit 58 selects as a terminal to be called the terminal (e.g., terminal 10ba) identified by the communication ID used as the search key in step S45-2 (step S45-4).

Next, in the case where it is determined that the operational state is not "ONLINE (COMMUNICATION AVAILABLE)", the state management unit 53 searches the terminal management table (refer to FIG. 6B) by using as a search key an arbitrarily selected second communication ID (e.g., "01db") selected from the communication IDs ("01ba", "01db") read in step S45-1, and reads corresponding operational state (step S45-5).

Next, the session control unit 58 determines whether the operational state read in step S45-5 is "ONLINE (COMMUNICATION AVAILABLE)" (step S45-6). In the case where it is determined that the operational state is "ONLINE (COMMUNICATION AVAILABLE)" in step S45-6, the session control unit 58 selects as a terminal to be called the terminal (e.g., terminal 10ba) identified by the communication ID used as the search key in step S45-5 (step S45-7).

Next, in the case where it is determined that the operational state is not "ONLINE (COMMUNICATION AVAILABLE)" in step S45-6, the state management unit 53 regularly reads corresponding operational states by using as search keys the communication IDs ("01ba", "01db") read in step S45-1, and reads corresponding operational state (step S45-5) in the terminal management table (refer to FIG. 6B) (step S45-8).

Next, the session control unit 58 determines whether the operational state read in step S45-5 has been changed to "ONLINE (COMMUNICATION AVAILABLE)" (step S45-9). In the case where it is determined in step S45-3 that the operational state has been changed to "ONLINE (COMMUNICATION AVAILABLE)", the session control unit 58 selects as a terminal to be called the terminal whose operational state has been changed to "ONLINE (COMMUNICATION AVAILABLE)" (step S45-10). It should be noted that the processing of step S45-8 will be repeatedly performed in the case where it is determined that the operational state read in step S45-5 has not been changed to "ONLINE (COMMUNICATION AVAILABLE)" (NO in step S45-9).

Next, the session control unit 58 generates management information related to controlling a content data session sed between the terminal 10aa and the destination terminal 10 (step S46). Here, in the case where the group information read in step S43 is "TRUE", the session control unit 58 generates management information "Private Invite" indicating a request for a start of a content data session sed with limited participation. Further, in the case where the group information read in step S43 is "FALSE", the session control unit 58 generates management information "Invite" indicating a request for a start of a content data session sed with unlimited participation.

As described above, according to an embodiment, in the case where the group information is "TRUE", a start of content data session sed with limited participation is requested. The reason why a start of the content data session sed with limited participation is requested is because the destination is a call center (refer to FIG. 7C) and it is not expected that a third party is going to participate in the established session. However, a method of setting limited participation is not limited to the method described above.

Next, the state management unit 53 changes communication states corresponding to the communication ID "01aa" of the start request terminal (terminal 10aa) and a communication ID of the destination terminal in the terminal management table (refer to FIG. 6B) (step S47-1). In this case, the state management unit 53 searches the state change management table (refer to FIG. 7B) by using the management information ("Private Invite" or "Invite") generated in step S46, and reads before-change state information and change information corresponding to each terminal's information. The state management unit 53 changes state information of each terminal 10 based on the read terminal information, before-change state information, and change information. For example, in the case where the management information generated in step S46 is "Private Invite", the state management unit 53 changes the state information corresponding to the communication ID of the start request terminal (10aa) from "None" indicated by the before-change state information to "Private Calling" indicated by the change information. Further, the state management unit 53 changes operational states associated with the communication IDs of the start request terminal (terminal 10aa) and the destination terminal to "ONLINE (TALKING)" in the terminal management table (step S47-2).

Figure 15:
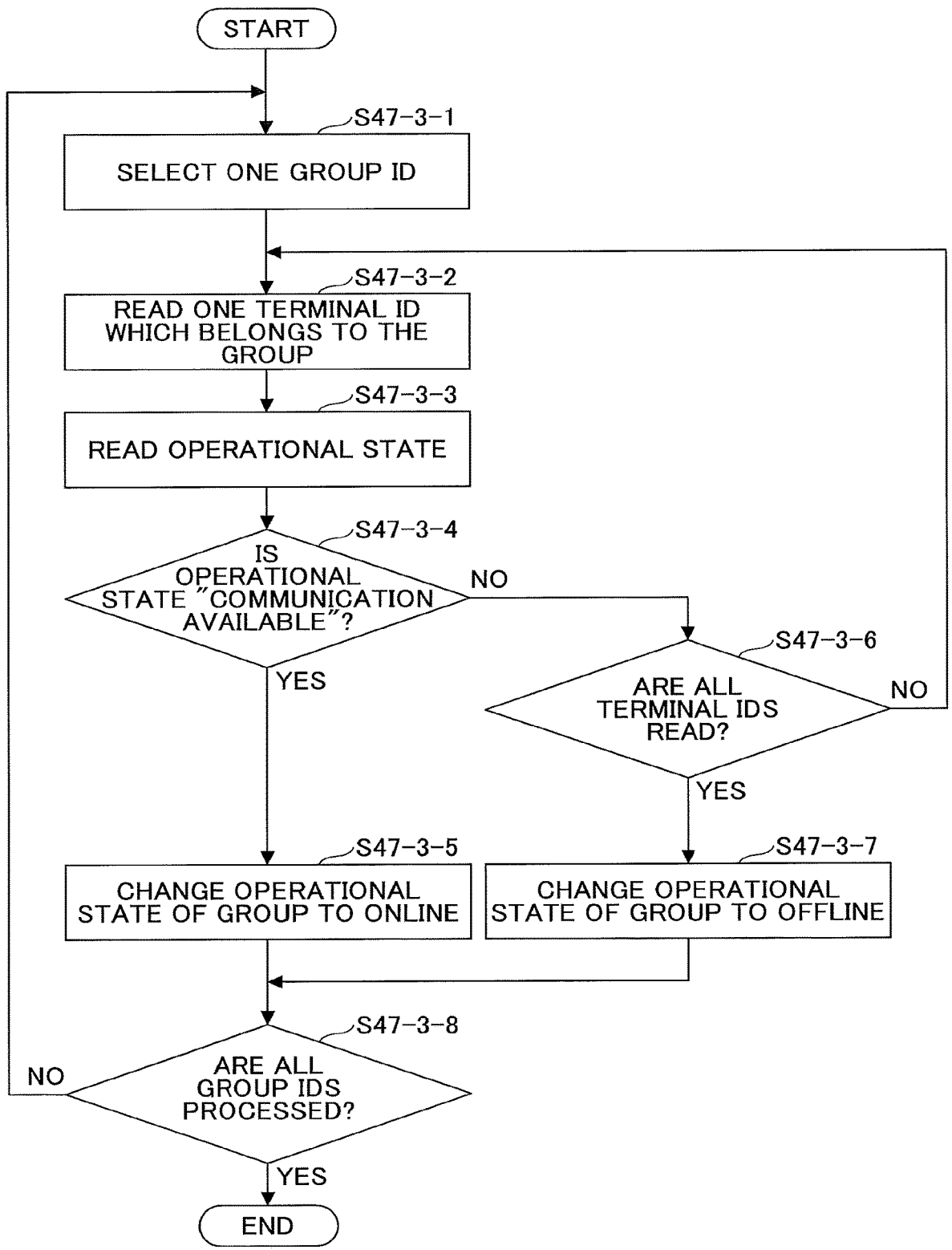
FIG. 15 is a flowchart illustrating a process for changing a group state.

In the case where the group information read in step S43 is "TRUE", the state management unit 53 updates an operational state of the group stored in the group state management table (refer to FIG. 7D) (step S47-3). Referring to FIG. 15, update processing of the operational state of a group by the management system 50 will be described. The above update processing is performed at any timing such as when an operational state of a terminal 10 included in the group is changed. It should be noted that the operational state update timing is not limited. For example, the update processing may be performed at a fixed time interval.

First, the storing and reading processing unit 59 refers to the group information management table illustrated in FIG. 7C, and selects a group ID whose group information is "TRUE" (step S47-3-1). Next, the storing and reading processing unit 59 reads one of communication IDs of terminals included in the group selected in step S47-3-1 (step S47-3-2). Next, the state management unit 53 refers to the terminal management table (refer to FIG. 6B), and reads an operational state corresponding to the communication ID read in step S47-3-2 (step S47-3-3).

The session management unit 53 determines whether the operational state read in step S47-3-3 is "ONLINE (COMMUNICATION AVAILABLE)" (step S47-3-4). In the case where it is determined that the operational state is "ONLINE (COMMUNICATION AVAILABLE)", the state management unit 53 determines that an operational state of the group ID selected in step S47-3-1 is "ONLINE (COMMUNICATION AVAILABLE)", and stores the determined information in the group state management table of FIG. 7D.

In the case where it is determined that the operational state is not "ONLINE (COMMUNICATION AVAILABLE)" in step S47-3-4, the state management unit 53 determines whether communication IDs of all terminals 10 included in the group selected in step 47-3-1 are read (step S47-3-6). In the case where it is determined in step S47-3-6 that the communication IDs of all terminals 10 are read, the state management unit 53 determines that an operational state of the group ID selected in step S47-3-1 is "OFFLINE", and stores the determined information in the group state management table of FIG. 7D (step S47-3-7). In the case where it is determined in step S47-3-6 that the communication IDs of all terminals 10 are not read, processing steps of step S47-3-2 are performed.

In step S47-3-8, the process ends in the case where the above processing is finished for all group IDs whose group information is "TRUE", and, otherwise, the process returns to step S47-3-1 and the processing will be performed for the next group ID.

With the above operations, it is possible to maintain operational states of the groups, and it is possible for a user of each terminal 10 to start a call by specifying a communication available destination without considering whether a destination registered in the destination list is a terminal 10 or a group.

Next, the session control unit 58 generates a session ID (e.g., "se1") for identifying a session (content data session sed) used for communications between the start request terminal (terminal 10aa) and the destination terminal requested by the start request terminal (terminal 10aa) (step S48).

Next, the session control unit 58 of the management system 50 selects a relay apparatus 30 for relaying content data by using the content data session sed between the start request terminal (terminal 10aa) and the destination terminal (step S49). In an embodiment, descriptions will be continued in the case where a relay apparatus 30e has been selected by the session management unit 57.

When processing selection of the relay apparatus 30 is completed, in the session management table (refer to FIG. 6d), the session management unit 57 associates the session ID generated in step S48 with a relay apparatus ID "111e" of the relay apparatus 30e selected in step S49, and communication IDs of participating terminals which participate in the session (the communication ID "01aa" of the start request terminal (terminal 10aa) and the communication ID (e.g., "01db") of the destination terminal), stores and maintains the associated result. (step S50).

Next, the transmission and reception unit 51 transmits to the start request terminal (terminal 10aa) via the communication network 2 the session ID generated in step S48, limitation information indicating existence or non-existence of terminal 10 participation limitation, and relay apparatus connection information used for connecting the relay apparatus 30e selected in step S49 (step S51). In the relay apparatus connection information, an IP address "1.1.1.3" of the relay apparatus 30e, authentication information, a port number, etc., may be included. With the above arrangement, it is possible for the terminal 10aa to obtain the relay apparatus connection information used for connecting to the relay apparatus 30e used for relaying content data in the session of the session ID "se1".

Next, the transmission and reception unit 51 transmits the communication ID "01aa" of the start request terminal (terminal 10aa), the management information generated in step S46 ("Private Invite" or "Invite"), the start request information including the session ID "se1" generated in step S48, the relay apparatus connection information used for connecting the relay apparatus 30e, and an IP address of the management system 50 to the destination terminal (step S52). With the above arrangement, the transmission and reception unit 11 of the destination terminal receives the start request information, and obtains the relay apparatus connection information used for connecting to the relay apparatus 30e used for relaying content data, and the IP address "1.1.1.2" of the management system 50 as a transmission source.

Figure 16:
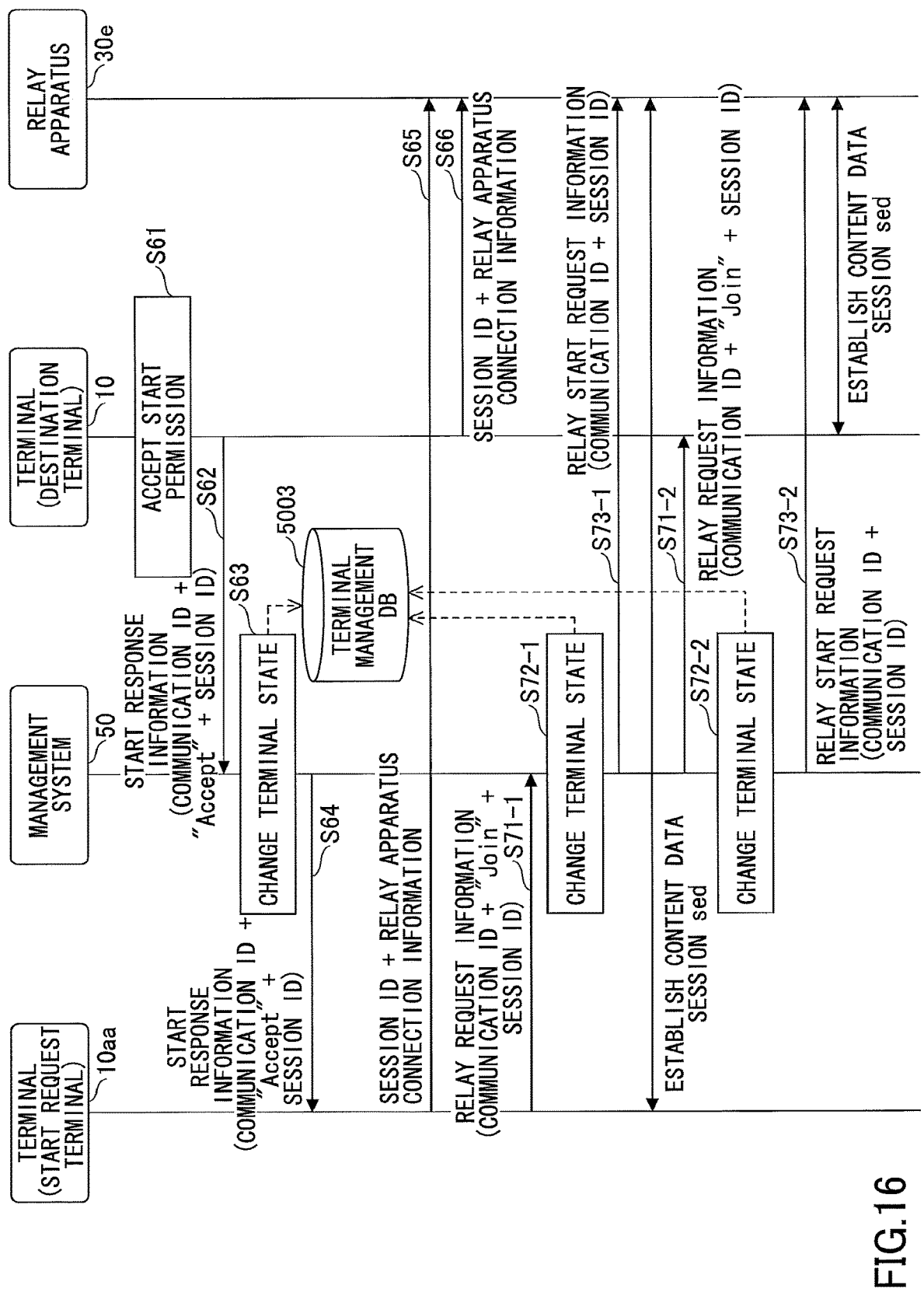
FIG. 16 is a sequence diagram illustrating a process for permitting the communication start request.

Next, referring to FIG. 16, processing will be described in the case where a communication start (session establishment) between the start request terminal (terminal 10aa) and the destination terminal is permitted by a user of the destination terminal. FIG. 16 is a sequence diagram illustrating a process for permitting the communication start request.

The display control unit 16 of the destination terminal displays a screen for accepting a permission for the start request on the display 120 based on the start request information and the management information transmitted from the management system 50. FIG. 17A is a drawing illustrating an example of a start permission accepting screen 1300-1 in the case where the management information transmitted from the management system 50 is "Private Invite". FIG. 17B is a drawing illustrating another example of the start permission accepting screen 1300-1 in the case where the management information transmitted from the management system 50 is "Invite". As illustrated in FIG. 17A, in the case where the management information is "Private Invite", it is indicated that there is participation limitation by displaying on the start permission accepting screen 1300-1, for example, "This meeting is a participation limited meeting."

A button indicating "YES" in the start permission accepting screen 1300-1 is pressed by an operation of the operation button 108 of the destination terminal by the user of the destination terminal, and, as a part of processing of step S61, the operation input accepting unit 12 receives a response indicating permitting the communication start (session establishment) between the start request terminal and the destination terminal. Next, the transmission and reception unit 11 of the destination terminal transmits to the management system 50 start response information including the communication ID of the destination terminal, the communication ID "01aa" of the start request terminal (terminal 10aa), management information "Accept" indicating permitting the session establishment, and a session ID "se1" (step S62).

When the start response information is received by the transmission and reception unit 51 of the management system 50, the state management unit 53 changes communication states corresponding to the communication ID "01aa" of the start request terminal (terminal 10aa) and the communication ID of the destination terminal in the terminal management table (refer to FIG. 6B) (step S63). In this case, the state management unit 53 searches the state change management table (refer to FIG. 7B) by using the management information ("Accept") included in the start response information, and reads before-change state information and change information corresponding to each terminal information. The state management unit 53 changes state information of each terminal 10 based on the read terminal information, before-change state information, and change information. For example, if the before-change communication state of the start request terminal (terminal 10aa) stored in the terminal management table is "Private Calling", then the communication state is changed to "Private Accepted", and if the before-change communication state is "Calling", then the communication state is changed to "Accepted". Similarly, if the before-change communication state of the destination terminal stored in the terminal management table is "Private Ringing", then the communication state is changed to "Private Accepted", and if the before-change communication state is "Ringing", then the communication state is changed to "Accepted".

Next, the transmission and reception unit 51 transmits start response information including the communication ID of the destination terminal, the management information "Accept", and the session ID "se1" to the start request terminal (terminal 10aa) (step S64). Upon receiving the start response information, the start request terminal (terminal 10aa) connects to the relay apparatus 30e by transmitting to the relay apparatus 30e the session ID "se1" and the relay apparatus connection information obtained in step S51 via the transmission and reception unit 11 (step S65). On the other hand, the destination terminal connects to the relay apparatus 30e by transmitting to the relay apparatus 30e the session ID "se1" and the relay apparatus connection information obtained in step S52 via the transmission and reception unit 11 (step S66).

Next, the transmission and reception unit 11 of the start request terminal (terminal 10aa) transmits to the management system 50 relay request information including the communication ID "01aa" of the start request terminal (terminal 10aa), the session ID "se1", and the management information "Join" indicating a request for a relay start (step S71-1).

When the relay request information is received by the transmission and reception unit 51 of the management system 50, the state management unit 53 changes the communication state corresponding to the communication ID "01aa" of the start request terminal (terminal 10aa) in the terminal management table (refer to FIG. 6B) (step S72-1). In this case, the state management unit 53 searches the state change management table (refer to FIG. 7A) by using the management information ("Join") received in step S71-1, and reads corresponding before-change state information and change information. The state management unit 53 changes state information of the terminal 10aa based on the read before-change state information and change information. For example, if the before-change communication state of the start request terminal (terminal 10aa) stored in the terminal management table is "Private Accepted", then the communication state is changed to "Private Busy", and if the before-change communication state is "Accepted", then the communication state is changed to "Busy".

Next, the management system 50 transmits to the relay apparatus 30e relay start request information including the communication ID "01aa" of the start request terminal (terminal 10aa) and the session ID "se1" (step S73-1). With the above operations, a content data session sed between the relay request terminal (terminal 10aa) and the relay apparatus 30e is established.

Further, by performing the similar processing as step S71-1 through step S73-1, a content data session sed between the destination terminal (terminal 10db) and the relay apparatus 30e is established (step S71-2 through step S73-2). When the content data session sed between the relay request terminal (terminal 10aa) and the relay apparatus 30e and the content data session sed between the destination terminal (terminal 10db) and the relay apparatus 30e are established, the relay apparatus 30e relays content data (image data and audio data) between the start request terminal (terminal 10aa) and the destination terminal. With the above operations, it is possible for the start request terminal (terminal 10aa) and the destination terminal to start a video conference.

It should be noted that, on the display 120 of the terminals 10 participating in a video conference, or, in the established session, information may be displayed during the video conference indicating whether the video conference is using a session with limited participation or a session with unlimited participation so that it is possible for the participants to recognize existence or non-existence of participation limitation of the video conference.

Figure 18A:
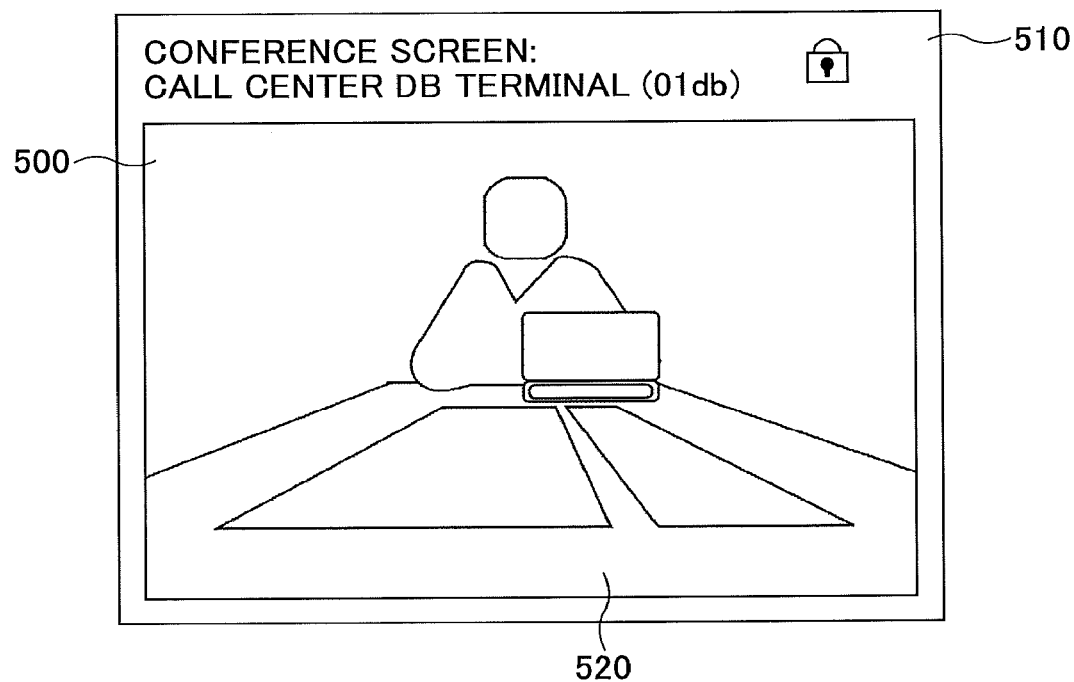
FIG. 18A is a drawing illustrating an example of a screen displayed during a meeting.
Figure 18B:
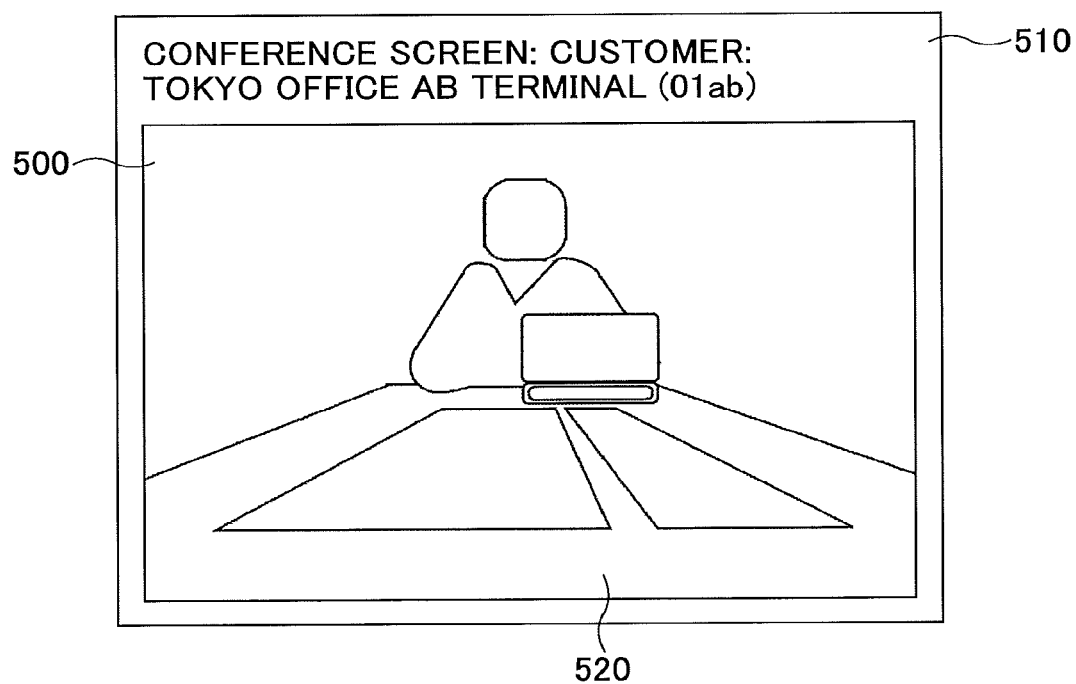
FIG. 18B is a drawing illustrating an example of a screen displayed during a meeting.

Here, referring to FIG. 18A and FIG. 18B, an example will be described in which the terminal 10 displays on the display 120 information related to existence or non-existence of participation limitation of the conference. FIG. 18A and FIG. 18B illustrate examples of screens displayed on the display 120 while the terminal 10 performs a video conference with another terminal. The display control unit 16 of the terminal 10 outputs, in addition to video 500 taken by the counterpart terminal 10, auxiliary area 510 for displaying detailed information related to the conference. The auxiliary area 510 includes information such as a communication ID, etc., of the counterpart.

Further, it is possible for the display control unit 16 of the terminal 10 to output in any location within the auxiliary area 510 information indicating whether the on-going conference is with or without participation limitation based on the limitation information transmitted from the management system 50 (refer to step S51) or the management information (refer to step S52). For example, it is possible for the display control unit 16 of the terminal 10 to output a key-shaped icon in the auxiliary area 510 in the case where the user has started a conference with participation limitation and a session related to the conference has been established. It is possible for the user of the terminal 10 to check whether the conference the user is participating in is with or without participation limitation based on existence or non-existence of the icon display.

Figure 19:
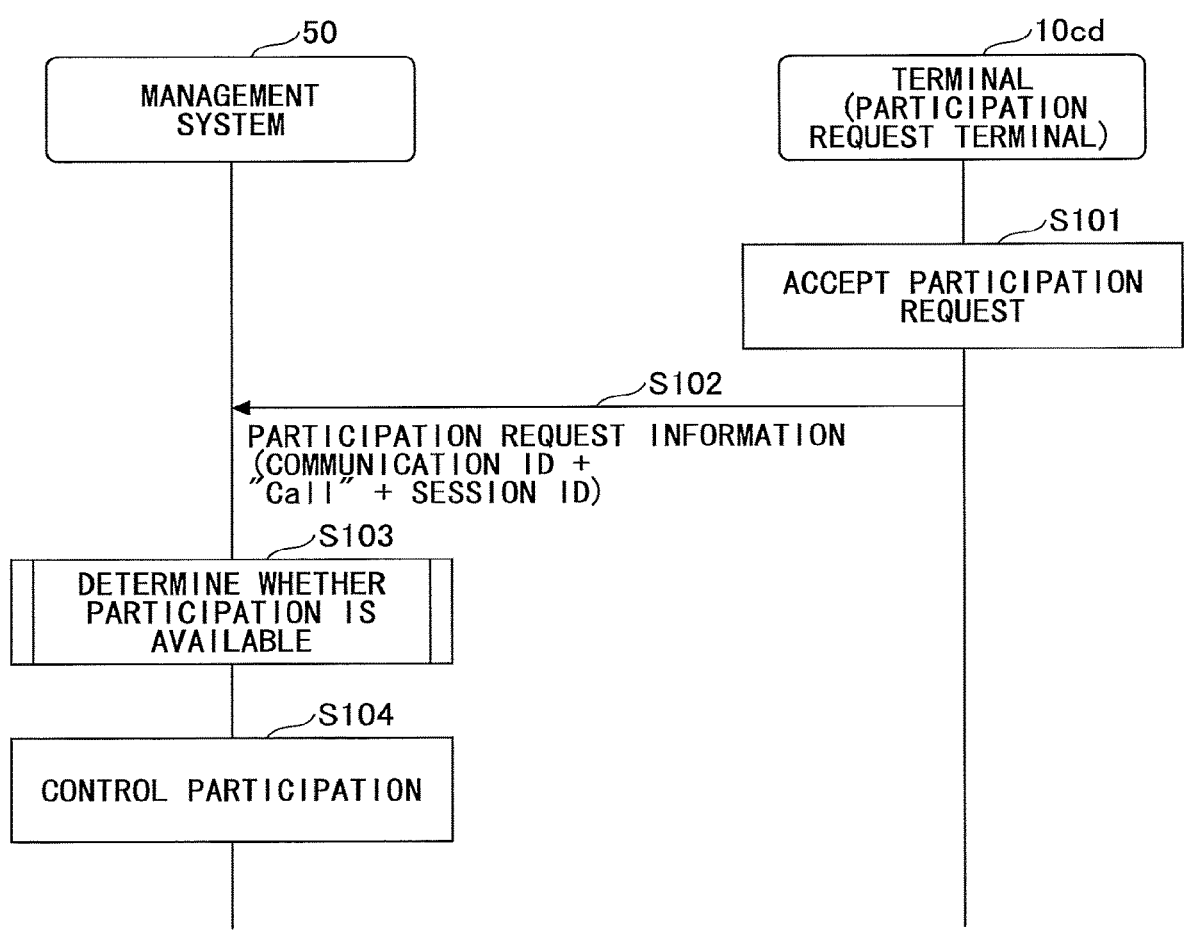
FIG. 19 is a sequence diagram illustrating a process for participating in a session for content data.

Next, referring to FIG. 19, processing will be described in the case where, after content data session has been established between the start request terminal (terminal 10aa) and the destination terminal, a terminal 10cd requests participation in the content data session. FIG. 19 is a sequence diagram illustrating a process for participating in the content data session. It should be noted that, in FIG. 19, a process is illustrated in which various types of management information items are transmitted and received via the management information session sei. In the followings, the terminal 10cd operates as a participation request terminal transmitting participation request information.

On the display 120cd of the terminal 10cd, a destination list is displayed according to the login processing described by referring to FIG. 11. The user of the participation request terminal (terminal 10cd) selects a terminal whose operational state is "TALKING" (here, the terminal 10aa) by operating the operation button 108. In response to the selection, the operation input accepting unit 12 receives a participation request for the already-established content data session sed (step S101).

With the above operations, the transmission and reception unit 11 of the participation request terminal (terminal 10cd) transmits to the management system 50 participation request information including the communication ID "01cd" of the terminal 10cd, the communication ID "01aa" of the selected terminal 10aa, the management information "Call" indicating a request for participating in the content data session (step S102).

Figure 20:
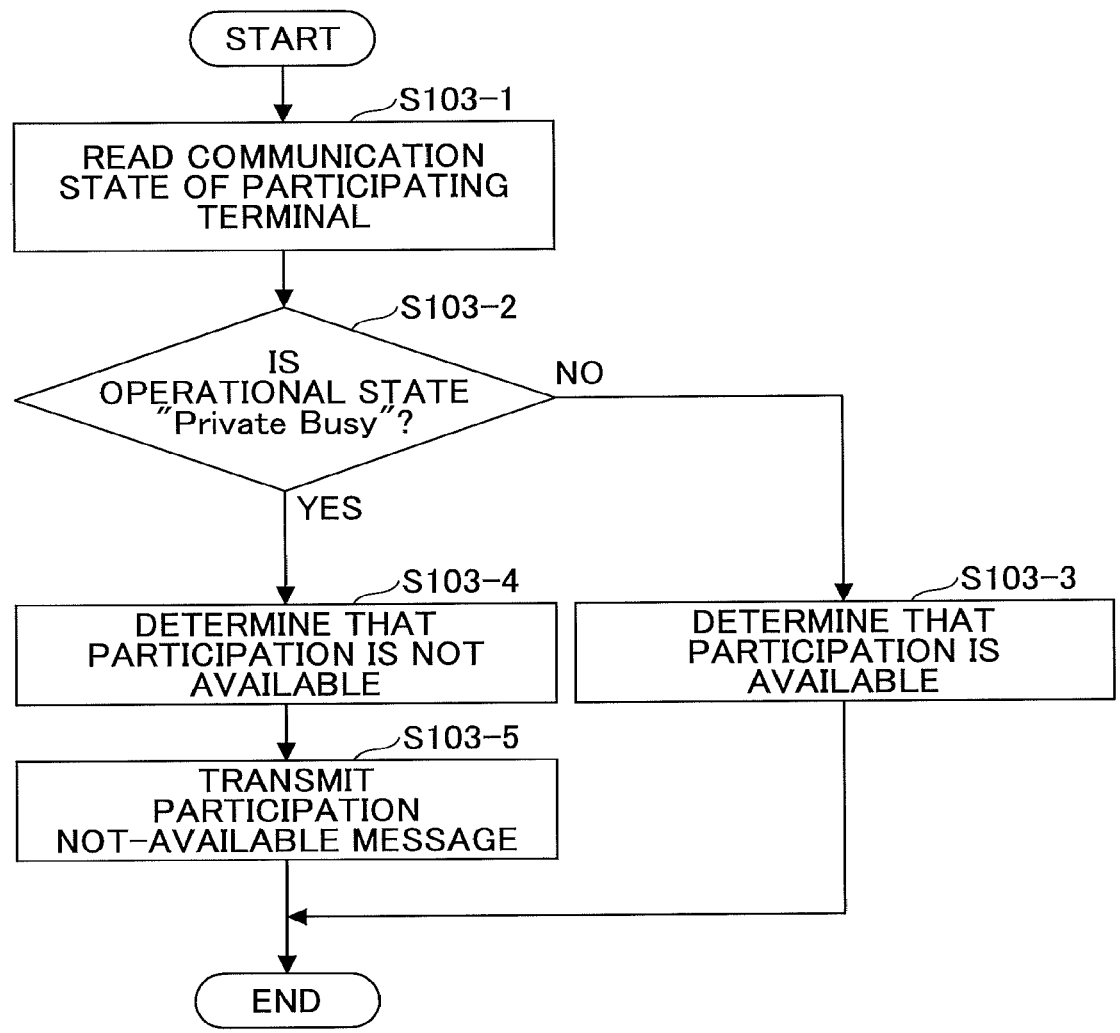
FIG. 20 is a flowchart illustrating participation determination processing based on a communication state.

Upon receiving the session participation request information, the management system 50 determines whether the processing should be continued for connecting the participation request terminal (terminal 10cd) to the terminals (10aa and 10db) currently participating in the content data session sed (step S103). Here, referring to FIG. 20, a process in step S103 will be described in detail. FIG. 20 is a flowchart illustrating participation determination processing based on the communication states.

First, the storing and reading processing unit 59 refers to the terminal management table (refer to FIG. 6B), and, by using as a search key the communication ID "01aa", included in the participation request information, of the terminal (terminal 10aa) currently participating in the session, reads a communication state corresponding to the communication ID "01aa" (step S103-1). Next, the session control unit 58 determines whether the read communication state is "Private Busy" (step S103-2). In the case where the read communication state is not "Private Busy", the session control unit 58 determines that it is possible for the participation request terminal to participate in the session (step S103-3), and ends the process.

On the other hand, in the case where the read communication state is "Private Busy", the session control unit 58 determines that it is not possible for the participation request terminal to participate in the session (step S103-4). Further, the transmission and reception unit 11 transmits a participation not-available message used for reporting that the participation in the session is not available to the participation request terminal (terminal 10cd) (step S103-5). It should be noted that, upon receiving the participation not-available message, the participation request terminal (terminal 10cd) displays the received message on the display 120.

In the case where it is determined by the session control unit 58 that it is possible for the participation request terminal to participate in the session, the management system 50 performs processing for causing the terminal 10cd to participate in the session used for transmitting content data between the terminals (10aa, 10db). The above processing includes, for example, transmitting to the terminal 10cd relay apparatus connection information used for connecting to the relay apparatus 30e to which the terminals (10aa, 10db) have been connected. A method of controlling the terminal participation is not limited. For example, a method described in Japanese Unexamined Patent Application Publication No. 2012-50063 can be listed.

<<Supplementary Description of Communication System 1>>

The management system 50 and the program providing system 90 according to an embodiment may include a single computer, or a plurality of computers to which corresponding units (functions or means) are divided and arbitrarily assigned. Further, in the case where the program providing system 90 includes a single computer, a program transmitted from the program providing system 90 may be divided into a plurality of modules and transmitted, or may be transmitted without being divided into modules. Further, in the case where the program providing system 90 includes a plurality of computers, a plurality of divided modules may be transmitted from the corresponding computers.

Further, a recording medium in which a terminal program, a relay apparatus program, and a communication management program of the communication system 1 are stored, an HD 204 in which the above programs are stored, and a program providing system 90 including the HD 204 can be used for providing the programs as program products for users in the country or abroad.

Further, in the communication system 1, it is assumed that IP addresses of the terminals are stored in the terminal management table illustrated in FIG. 6B. It is not limited to the IP addresses of the terminal that are stored. As long as it is relay apparatus identifying information that can be used for identifying the relay apparatus 30 on the communication network 2, or as long as it is terminal identifying information that can be used for identifying the terminal 10 on the communication network 2, Fully Qualified Domain Names (FQDN) of the relay apparatuses and the terminals 10 may be stored. In this case, an IP address corresponding to the FQDN is obtained according to a known Domain Name Server (DNS).

In the communication system 1, the "video conference" is used as a term which can be replaced with "TV conference".

Further, in the above communication system 1, as an example of the communication system 1, a case of video conference system has been described, but the case is not limited to the video conference system and may be a car navigation system. In this case, for example, one of the terminals 10 corresponds to a car navigation apparatus mounted on a car, and the other of the terminals 10 corresponds to a management terminal or a management server in a management center that controls a car navigation system, or another car navigation apparatus mounted on another car.

Figure 21:
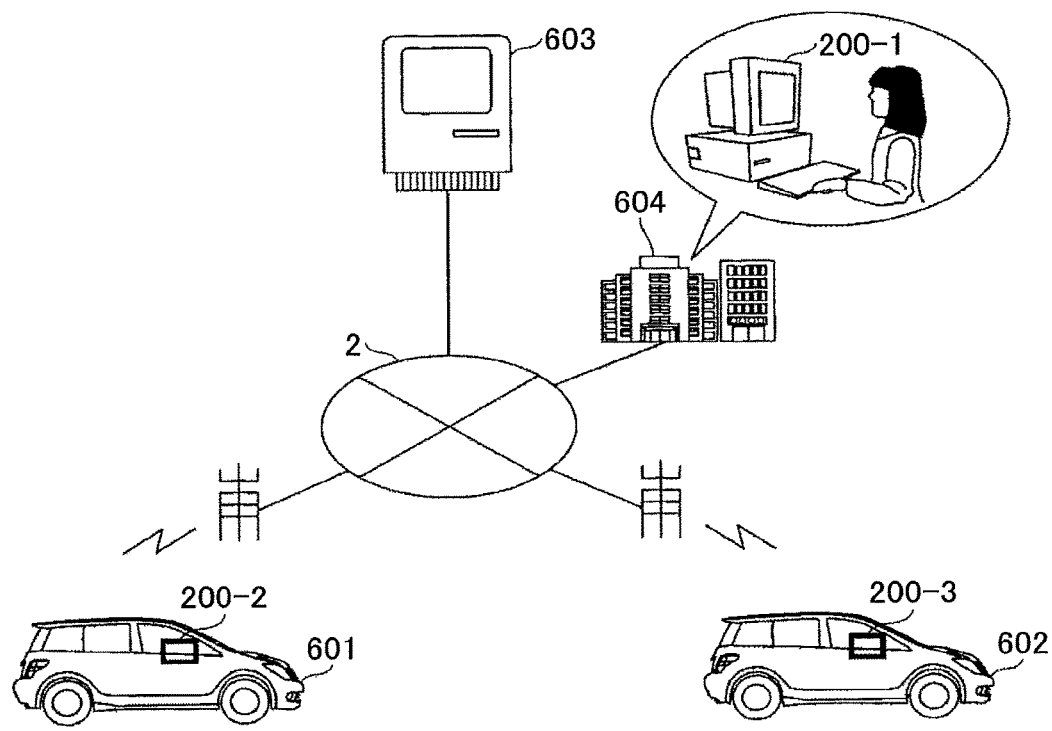
FIG. 21 is a drawing illustrating an example of a system structure diagram in the case where a terminal is used as a car navigation apparatus.

FIG. 21 is a drawing illustrating an example of a system structure in the case where the terminal 10 is used as a car navigation apparatus. In this case, one of the terminals 10 corresponds to a car navigation apparatus 200-2 installed in a car 601. Another terminal 10 corresponds to a management terminal 200-1 used by a communicator of a management center 604, a management server 603 for controlling the car navigation apparatus, or a car navigation apparatus 200-3 installed in another car 602.

Figure 22:
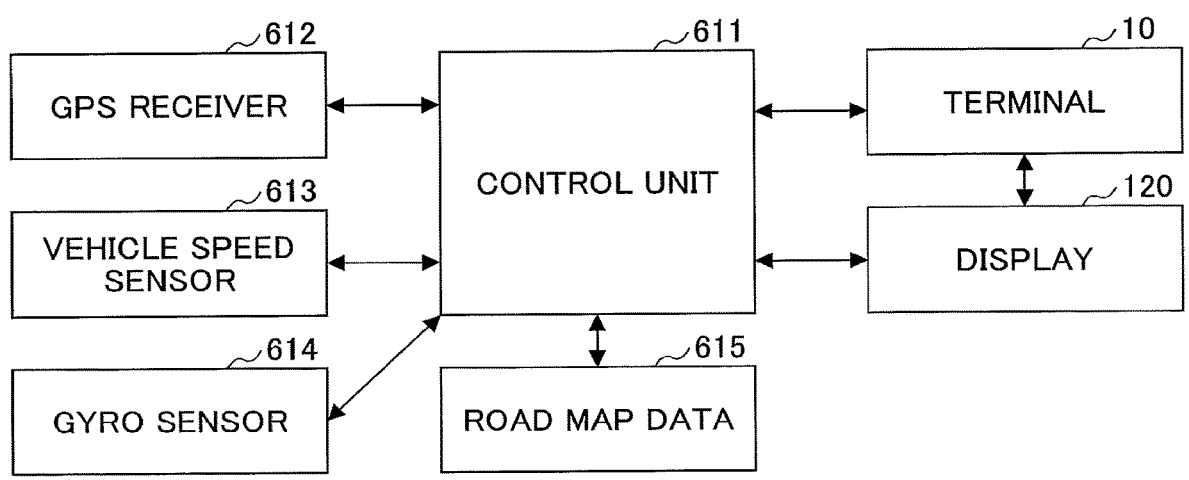
FIG. 22 is a drawing illustrating an example of a structure diagram of the car navigation apparatus.

FIG. 22 is an example of a structure diagram of a car navigation apparatus. The car navigation apparatus includes a control unit 611 for controlling the entire apparatus, a GPS receiver 612, a vehicle speed sensor 613, a gyro sensor 614, road map data 615, etc. Further, the terminal 10 according to an embodiment is connected to the control unit 611. The control unit 611 includes a microcomputer, etc., executes a program, and provides functions as a car navigation apparatus. The GPS receiver 612 captures timing signals of GPS satellites and outputs coordinates of its current position. The vehicle speed sensor 613 detects speed of a vehicle (rotational speed of a wheel). The gyro sensor 614 detects angular velocity. A direction of travel of a vehicle can be calculated by integrating the angular velocity.

The road map data 615 is data in which a node and a link are combined to represent a road, which may be downloaded from outside or stored in the vehicle beforehand. The road map is displayed on the display 120.

The control unit 611 estimates a position of the vehicle by applying an autonomous navigation method to positional information calculated by the GPS receiver 612, in which method a travel distance calculated by the car speed sensor 613 is combined with the direction of travel detected by the gyro sensor 614. The position of the vehicle is displayed on the road map by using a vehicle mark or the like.

The car navigation apparatus is connected to the communication network 2 via a mobile telephone line, etc., by using a function of the terminal 10 or a function of a mobile telephone.

The terminal 10 displays on the display 120 a screen as shown in FIG. 12, and a person in the car selects a destination terminal from a list of destination terminals displayed on the display 120. After the login, image data of a camera and audio data can be transmitted and received. Further, an information processing apparatus can obtain display data including the road map data and TV video data with an operation by the person in the car. In this case, the car navigation apparatus can transmit the display data to a destination car navigation apparatus.

Therefore, similar to the terminals 10 installed in an office, the terminal installed in a mobile body can also transmit and receive image data, audio data, and display data.

Further, the communication system 1 may be an audio conference system or a personal computer (PC) screen sharing system. Further, the communication system 1 may be a communication system of an Internet protocol (IP) telephone, an Internet phone, or a mobile telephone. In this case, for example, the terminal 10 corresponds to a phone such as a mobile telephone.

Further, the content data may be data indicating information in a body including audio data generated in the body such as pulse sound and beating of the heart, image data or coordinate data indicating an electro-cardiogram waveform or changes in body temperature. With the above arrangement, the communication system 1 according to an embodiment can be also used as a telemedicine system.

Further, in an embodiment, image data and audio data are described as an example of content data, but the content data is not limited to image data and audio data, but may be touch data. In this case, the sense of touching of the user at one terminal is transmitted to another terminal. Further, the content data may be smell data. In this case, the smell (odor) at one terminal is transmitted to another terminal. Further, the content data may be at least one of the image data, the audio data, the touch data, and the smell data.

Further, in an embodiment, the communication system 1 is used for, but not limited to, video conferencing. The communication system 1 may also be used for a meeting or an ordinary conversation between family members, friends, or the like, or may be used for offering single direction information.

DESCRIPTION OF THE REFERENCE NUMERALS

10 Communication terminal
11 Transmission and reception unit
12 Operation input accepting unit
13 Login request unit
14 Imaging unit
15 Audio input/output unit
16 Display control unit
19 storing and reading processing unit
20 Destination list generation unit
30 Relay apparatus
50 Communication management system
51 Transmission and reception unit
52 Authentication unit
53 State management unit
57 Session management unit
58 Session control unit
59 Storing and reading processing unit
5000 Non-volatile storage unit
5002 Authentication management DB
5003 Terminal management DB
5004 Destination list management DB
5005 Session management DB
5009 State change management DB
5010 Group information management DB
5011 Group state management DB

What is claimed is:

1. A control system for controlling a session for transmitting information between communication terminals, the control system comprising:
    processing circuitry configured to
        receive, from one of the communication terminals, a communication start request that includes a destination identifier,
        determine whether the destination identifier identifies a group including a plurality of communication terminals or identifies only one destination communication terminal,
        when determining that the destination identifier identifies the group, determine a corresponding operational state of at least one of the plurality of communication terminals in the group, and when determining that the operational state of one of the plurality of communication terminals in the group is online, determine that a state of the group is online and cause an online icon to be displayed, otherwise, determine that the state of the group is offline and cause an offline icon to be displayed,
        establish a first session with limited participation, in which only the plurality of communication terminals in the group can participate, when determining that the destination identifier identifies the group, establish a second session with unlimited participation, in which another communication terminal, in addition to the only one destination communication terminal can also participate, when determining that the destination identifier identifies the only one destination communication terminal,
        reject participation of the another communication terminal in the first session when the first session has been established, and
        permit participation of the another communication terminal in the second session when the second session has been established.

2. The control system according to claim 1, wherein the processing circuitry is further configured to:
    when the first session has been established based on the communication start request from the one of the communication terminals identifying the group, associate first state information indicating a first communication state with each of the communication terminals participating in the first session and store the associated result, and when the second session has been established based on the communication start request from the one of the communication terminals identifying the only one destination communication terminal, associate second state information indicating a second communication state with each of the communication terminals participating in the session and store the associated result, and reject participation of the another communication terminal in the first session in which the communication terminals that are associated with the first state information are participating, and permit participation of the another communication terminal in the second session in which the communication terminals that are associated with the second state information are participating.

3. The control system according to claim 1, further comprising a memory to store terminal identification information identifying the communication terminals included in the group, wherein the processing circuitry is further configured to accept, from the one of the communication terminals, the communication start request including the destination identifier; and when the communication start request identifies the group, select, from the communication terminals identified by the terminal identification information items stored in the memory, at least one of the plurality of the communication terminals included in the group as a communication counterpart of the communication terminal as a start request source.

4. The control system according to claim 3, wherein the memory is further configured to store determination information used for determining whether the destination identifier identifies the group, wherein, when the communication start request including the destination identifier, which is determined, based on the determination information, to be the group, the processing circuitry is further configured to select, as the communication counterpart, at least one of the plurality of the communication terminals included in the group.

5. A communication system, comprising:
the control system according to claim 1; and
the communication terminals.

6. The communication system according to claim 5, wherein the communication system is one of a video conference system, an audio conference system, a car navigation system, a screen sharing system, and a telemedicine system.

7. A control method of a control apparatus for controlling a session for transmitting information between communication terminals, the control method comprising:

receiving, from one of the communication terminals, a communication start request that includes a destination identifier;

determining whether the destination identifier identifies a group including a plurality of communication terminals or identifies only one destination communication terminal;

when determining that the destination identifier identifies the group, determining a corresponding operational state of at least one of the plurality of communication terminals in the group, and when determining that the operational state of one of the plurality of communication terminals in the group is online, determining that a state of the group is online and cause an online icon to be displayed, otherwise, determining that the state of the group is offline and cause an offline icon to be displayed;

establishing a first session with limited participation, in which only the plurality of communication terminals in the group can participate, when determining that the destination identifier identifies the group, but establishing a second session with unlimited participation, in which another communication terminal, in addition to the only one destination communication terminal, can also participate, when determining that the destination identifier identifies the only one destination communication terminal;

rejecting participation of the another communication terminal in the first session when the first session has been established; and permitting the participation of the another communication terminal in the second session when the second session has been established.

8. A non-transitory computer readable recording medium for storing a program used for causing a computer to perform a control method for controlling a session for transmitting information between communication terminals, the control method comprising:

receiving, from one of the communication terminals, a communication start request that includes a destination identifier;

determining whether the destination identifier identifies a group including a plurality of communication terminals or identifies only one destination communication terminal;

when determining that the destination identifier identifies the group, determining a corresponding operational state of at least one of the plurality of communication terminals in the group, and when determining that the operational state of one of the plurality of communication terminals in the group is online, determining that a state of the group is online and cause an online icon to be displayed, otherwise, determining that the state of the group is offline and cause an offline icon to be displayed;

establishing a first session with limited participation, in which only the plurality of communication terminals in the group can participate, when determining that the destination identifier identifies the group, but establishing a second session with unlimited participation, in which another communication terminal, in addition to the only one destination communication terminal, can also participate, when determining that the destination identifier identifies the only one destination communication terminal;

rejecting participation of the another communication terminal in the first session when the first session has been established; and permitting the participation of the another communication terminal into the second session when the second session has been established.

9. The communication system of claim 5, wherein the one of the communication terminals includes circuitry configured to cause a display to display a destination setting screen, which allows a user to select a desired destination from at least one displayed destination, the selected desired destination corresponding to the destination identifier included in the communication start request.

10. The communication system of claim 5, wherein the at least one displayed destination includes a first destination identifier identifying the group that includes the plurality of communication terminals, and a second destination identifier identifying a single communication terminal.

* * * * *